United States Patent
Usui et al.

(10) Patent No.: US 12,104,986 B2
(45) Date of Patent: Oct. 1, 2024

(54) STRUCTURE EVALUATION SYSTEM, STRUCTURE EVALUATION APPARATUS, AND STRUCTURE EVALUATION METHOD

(71) Applicant: Kabushiki Kaisha Toshiba, Tokyo (JP)

(72) Inventors: Takashi Usui, Saitama (JP); Hidefumi Takamine, Shinagawa (JP); Yuki Ueda, Yokohama (JP); Keisuke Ueno, Kawasaki (JP); Yousuke Hisakuni, Sagamihara (JP); Kazuo Watabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/653,291

(22) Filed: Mar. 3, 2022

(65) Prior Publication Data

US 2023/0083554 A1 Mar. 16, 2023

(30) Foreign Application Priority Data

Sep. 16, 2021 (JP) .................................. 2021-151057

(51) Int. Cl.
G01M 7/08 (2006.01)
(52) U.S. Cl.
CPC ..................................... G01M 7/08 (2013.01)
(58) Field of Classification Search
CPC ...................................................... G01M 7/08
See application file for complete search history.

(56) References Cited

U.S. PATENT DOCUMENTS 10,955,383 B2 * 3/2021 Usui ...................... G01N 29/04
2009/0014634 A1 * 1/2009 Sikora ................ G01M 11/3145
250/227.14

(Continued)

FOREIGN PATENT DOCUMENTS

EP 3 290 915 A1 3/2018
JP WO 2017/217033 A1 12/2017

(Continued)

OTHER PUBLICATIONS

Machine translation of JPWO2019082292A1 (Year: 2020).*

(Continued)

*Primary Examiner* — Lee E Rodak
*Assistant Examiner* — Sangkyung Lee
(74) *Attorney, Agent, or Firm* — Oblon, McClelland, Maier & Neustadt, L.L.P.

(57) ABSTRACT

According to one embodiment, a structure evaluation system includes at least three or more sensors, a position locator, and an evaluator. The three or more sensors are arranged on surfaces different from a surface to which an impact is applied with respect to a structure at different intervals in a first direction of the structure and a second direction orthogonal to the first direction and detects elastic waves generated from the structure. The position locator locates a position of a source in which the elastic waves are generated on the basis of the elastic waves detected by each of the three or more sensors. The evaluator evaluates a deterioration state of the structure on the basis of information based on a position location process of the position locator and information indicating a position where the impact is applied.

8 Claims, 14 Drawing Sheets

(56) References Cited

U.S. PATENT DOCUMENTS

2016/0284973 A1* 9/2016 Ohashi .................. B06B 1/0644
2017/0363587 A1 12/2017 Takamine et al.
2018/0372580 A1* 12/2018 Takamine ............ G01N 29/045

FOREIGN PATENT DOCUMENTS

WO    WO 2017/217034 A1    12/2017
WO    WO-2019082292 A1 *   5/2019   ............. G01V 1/168
WO    WO 2022/01 4004 A1     1/2022

OTHER PUBLICATIONS

Kim et al. "Regular_sensor_deployment_patterns_for_p-coverage_and_q-connectivity_in_wireless_sensor_networks," ICOIN 2012. (Year: 2012).*

Takamine, H., et al., "Efficient damage inspection of deteriorated RC bridge deck with rain-induced elastic wave", Construction and Building Materials, Elsevier, Netherlands, Retrieved from the Internet: URL:https://api.elsevier.com/content/article/PII:S095006181830120X?httpAccept=text/plain, vol. 162, Feb. 20, 2018 (Feb. 20, 2018), pp. 908-913, XP009537395, ISSN: 0950-0618, DOI: 10.1016/J.CONBUILDMAT.2018.01.100.

* cited by examiner

US 12,104,986 B2

STRUCTURE EVALUATION SYSTEM, STRUCTURE EVALUATION APPARATUS, AND STRUCTURE EVALUATION METHOD

CROSS-REFERENCE TO RELATED APPLICATION

This application is based upon and claims the benefit of priority from Japanese Patent Application No. 2021-151057, filed Sep. 16, 2021; the entire contents of which are incorporated herein by reference.

FIELD

Embodiments described herein relate generally to a structure evaluation system, a structure evaluation apparatus, and a structure evaluation method.

BACKGROUND

It is possible to install a sensor on a surface of a structure such as a bridge and detect elastic waves generated inside of the structure. Furthermore, it is possible to install a plurality of sensors on a surface of a structure and locate a position of a source in which the elastic waves are generated (hereinafter referred to as an "elastic wave source") on the basis of a difference between arrival times of elastic waves detected by the sensors. Elastic waves are generated inside of the structure even if an external impact has been applied to the surface of the structure. Thus, a position of the elastic wave source can be located.

When there is damage in a propagation path of elastic waves inside of the structure, the propagation of elastic waves is hindered. In this case, the accuracy of a result of locating a position of the elastic wave source is lowered. When a spatially uniform impact such as a collision with a road surface caused by raindrops during rainfall is applied to the surface of a structure and elastic waves are detected by sensors installed facing each other, a density of the elastic wave sources is reduced in a region with internal damage and the reduced density is observed. Damage inside of the structure can be detected using such characteristics.

When a method of applying a uniformly applied impact to the surface of the structure is used, a distribution of the elastic wave source will be uniform if there is no damage inside of the structure. This method is based on the premise that a uniformly applied impact is applied to the surface of the structure. However, it is necessary to use a natural phenomenon such as raindrops or to hit the road surface over a wide range so that a uniform impact is applied to the road surface. Thus, it is necessary to restrict lanes, which may impair the convenience of users. Although usage restrictions may be avoided by applying an impact only to a limited range that does not require restrictions, the accuracy of the position location may be lowered when the impact applied to the surface of the structure is not uniform.

DETAILED DESCRIPTION

The present invention provides a problem to be solved by the present invention is to provide a structure evaluation system, a structure evaluation apparatus, and a structure evaluation method capable of improving the accuracy of an evaluation of a structure even if an impact applied to a surface of the structure is not uniform.

According to one embodiment, a structure evaluation system including: at least three or more sensors arranged on surfaces different from a surface to which an impact is applied with respect to a structure at different intervals in a first direction of the structure and a second direction orthogonal to the first direction and configured to detect elastic waves generated from the structure; a position locator configured to locate a position of a source in which the elastic waves are generated on the basis of the elastic waves detected by each of the three or more sensors; and an evaluator configured to evaluate a deterioration state of the structure on the basis of information based on a position location process of the position locator and information indicating a position where the impact is applied.

Hereinafter, a structure evaluation system, a structure evaluation apparatus, and a structure evaluation method of embodiments will be described with reference to the drawings.

(Overview)

The structure evaluation system according to the embodiment is a system capable of improving the accuracy of an evaluation of a structure even if an impact applied to a surface of the structure (hereinafter referred to as a "road surface") is not spatially uniform. A case where the impact applied to the road surface is not spatially uniform is a case where a position of an impact applied within a region serving as an evaluation target is biased. For example, a case where the impact applied to the road surface is not spatially uniform is assumed to be a case where a vehicle passes over the road surface (a surface of a structure 50) as shown in FIG. 1.

Figure 1A:
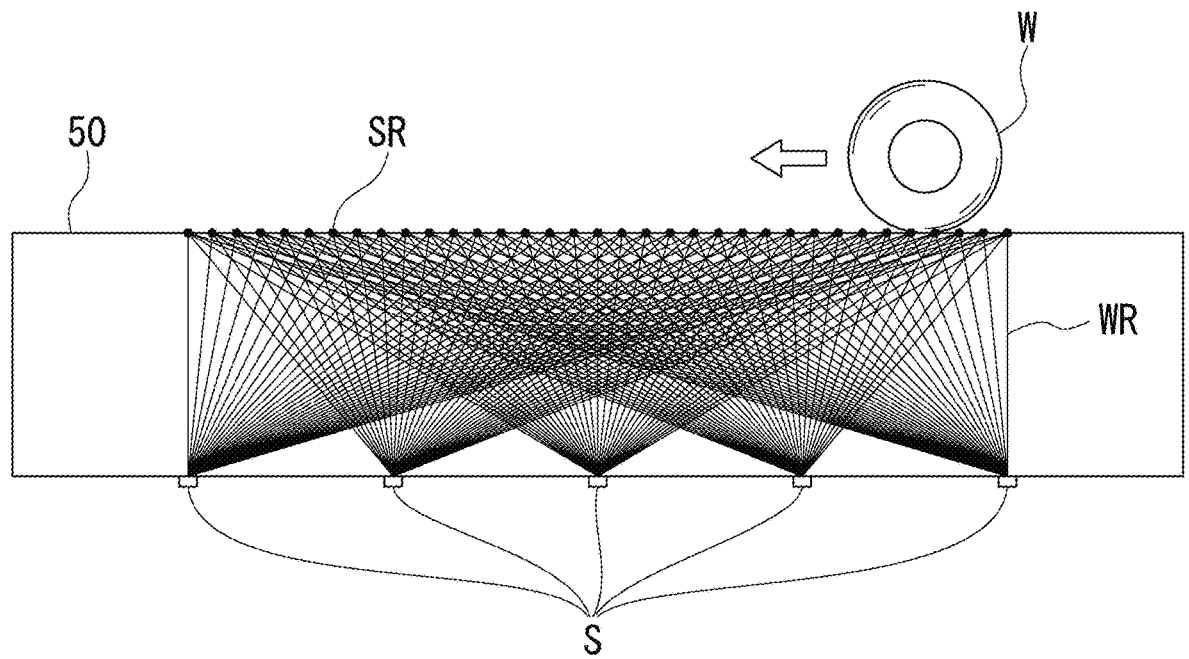
FIG. 1A is a diagram showing a wave ray distribution when the traveling portion of the vehicle traveling on the road surface and the structure are viewed from the side.
Figure 1B:
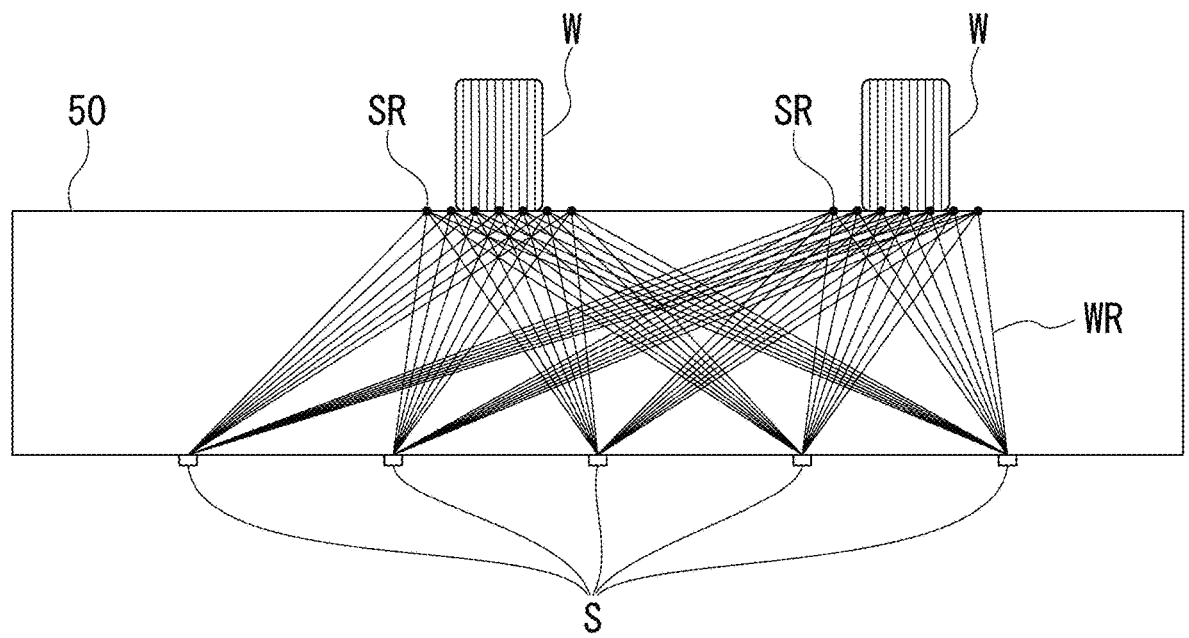
FIG. 1B is a diagram showing a wave ray distribution when the traveling portion of the vehicle traveling on the road surface and the structure are viewed from the front.

FIGS. 1A and 1B area diagram for describing an overview regarding a sensor arrangement of the structure evaluation system according to the embodiment. Under the situation as shown in FIG. 1, a load is applied to the road surface due to contact between a traveling portion W (for example, a tire) of the vehicle and the road surface. The load on the road surface is caused by the traveling portion W of the vehicle. In this way, the traveling portion W of the vehicle applies an impact to the road surface. As a result, elastic waves are generated within the structure 50. A place where the traveling portion W of the vehicle comes into contact with the road surface becomes an elastic wave source SR. On the other hand, no impact is applied to a region over which the traveling portion W of the vehicle does not pass among regions of the road surface.

When the elastic waves generated by the traveling portion W of the vehicle have been detected by one or more sensors S installed on a lower surface of the structure 50, a density of the elastic wave sources SR is reduced in a region where the inside of the structure 50 is damaged and the reduced density is observed. The damage of the inside of the structure 50 can be detected by utilizing such characteristics. That is, it is possible to evaluate the presence or absence of damage in a passing range of an elastic wave ray WR when the elastic waves generated by the traveling portion W of the vehicle propagate to the one or more sensors S. The elastic wave ray WR is an imaginary line perpendicular to the wavefront that indicates the propagation path of elastic waves.

In FIG. 1A, a wave ray distribution when the traveling portion W of the vehicle traveling on the road surface and the structure 50 are viewed from the side is shown. In FIG. 1B, a wave ray distribution when the traveling portion W of the vehicle traveling on the road surface and the structure 50 are viewed from the front is shown. Also, an arrow in FIG. 1A indicates a vehicle traveling direction (a first direction). The wave ray distribution represents a distribution of a plurality of elastic wave rays WR.

Because the traveling portion W of the vehicle travels in the vehicle traveling direction, elastic wave sources SR are continuously present in the vehicle traveling direction. Thus, as shown in FIG. 1A, it can be seen that elastic wave rays WR are evenly distributed over a wide range. On the other hand, as shown in FIG. 1B, in relation to the elastic waves generated by the traveling portion W of the vehicle, the elastic wave sources SR are concentrated at a wheel load position where the traveling portion W of the vehicle travels. Here, the wheel load position is a position where a load is applied by the traveling portion W of the vehicle. Thus, it can be seen that a path of the elastic waves passing through the inside of the structure 50 is biased. As shown in FIG. 1B, it can be seen that the distribution of the elastic wave rays WR becomes sparse and there is a region through which the elastic wave rays WR do not pass. In this case, even if there is damage in the region through which the elastic wave rays WR do not pass, an evaluation process cannot be performed.

Figure 2:
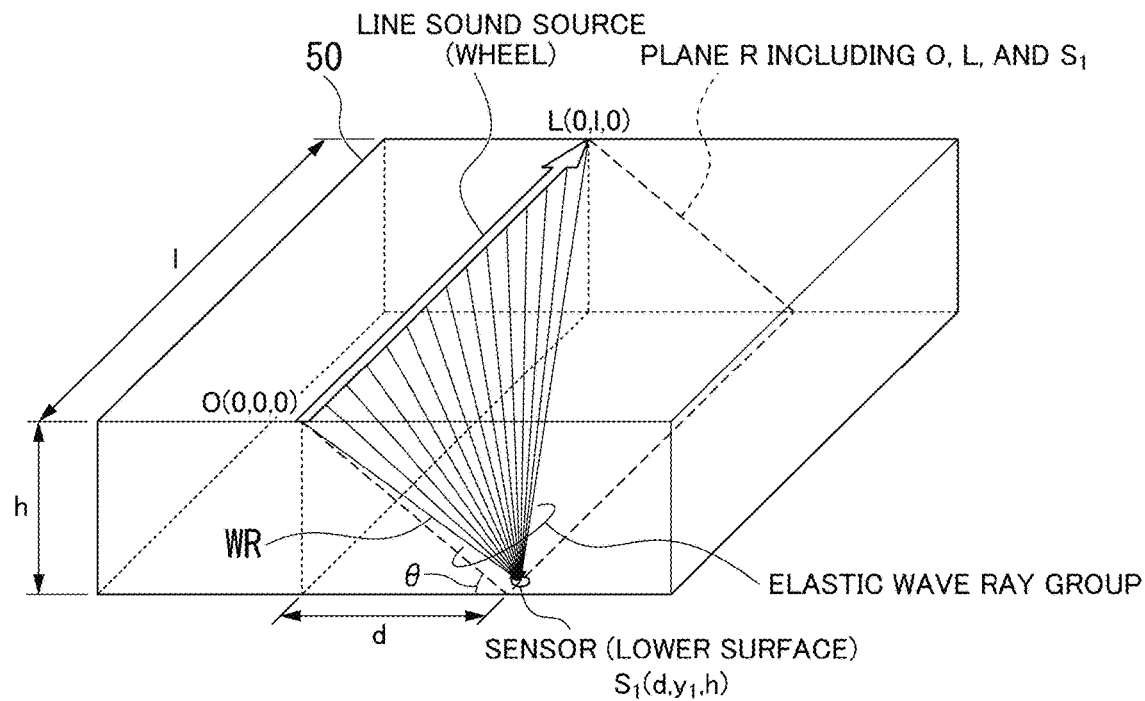
FIG. 2 is a diagram showing a relationship between a wave ray of elastic waves caused by a traveling portion of a vehicle traveling on a road surface and a sensor.

FIG. 2 is a diagram for describing a relationship between the wave ray WR of the elastic waves caused by the traveling portion W of the vehicle traveling on the road surface and the sensor S. The elastic waves generated by the interaction between the traveling portion W of the traveling vehicle and the road surface can be assumed to be a sufficiently long line sound source. Here, a line sound source is used from coordinates O(0, 0, 0) to L(0, l, 0) separated by a sufficiently long distance l. At this time, an elastic wave ray group transmitted to a sensor $S_1(d, y_1, h)$ installed on the lower surface of the structure 50 having a thickness h is placed on a plane R including O, L, and $S_1$ as shown in FIG. 2. The region through which the elastic wave rays WR pass corresponds to an inspection range that can be covered by the sensor $S_1$.

Figure 3:
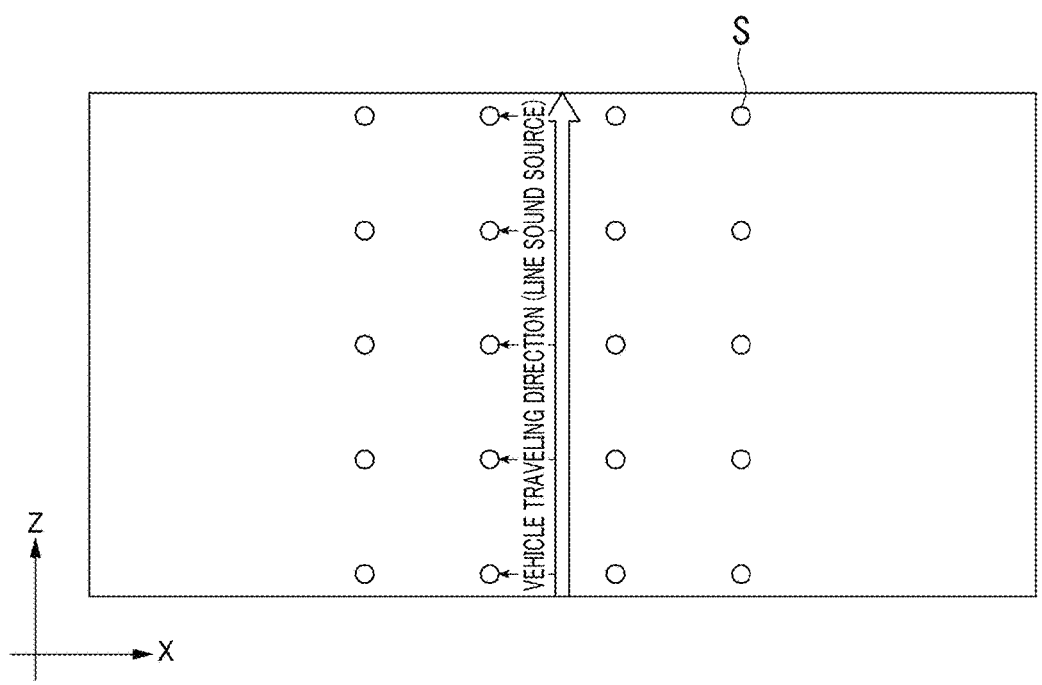
FIG. 3 is a diagram showing an example of a conventional sensor arrangement.

Normally, when a prescribed inspection region is surrounded by a plurality of sensors S, an arrangement of the plurality of sensors S is arranged at intersections of substantially square grid portions. In the case of a structure such as a bridge, as shown in FIG. 3, the sensors S are arranged in a grid pattern with respect to two axes in a Z-axis direction (for example, a vehicle traveling direction) and an X-axis direction (for example, a direction orthogonal to the vehicle traveling direction) (a second direction). The arrangement intervals of the sensors S shown in FIG. 3 are equal. In this case, the region where the deterioration state can be evaluated on the basis of the elastic waves detected by each sensor S is within a range surrounded by the sensors S. In general, the Z-axis direction and the traveling axis direction of the vehicle coincide with each other. Therefore, in this case, focusing on the row in the Z-axis direction, each sensor S is aligned in parallel to the Z-axis direction.

Figure 4A:
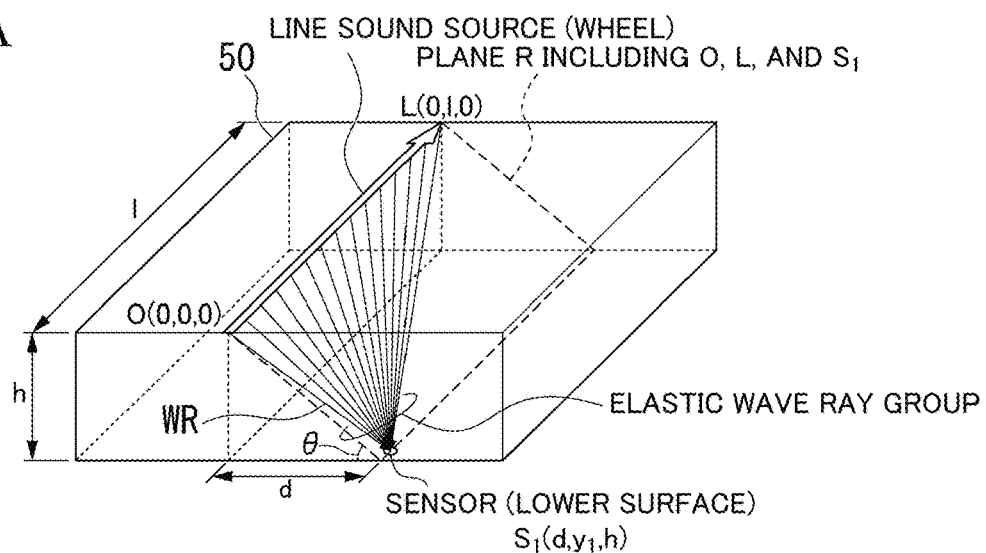
FIG. 4A is a diagram showing a problem of the conventional sensor arrangement.
Figure 4B:
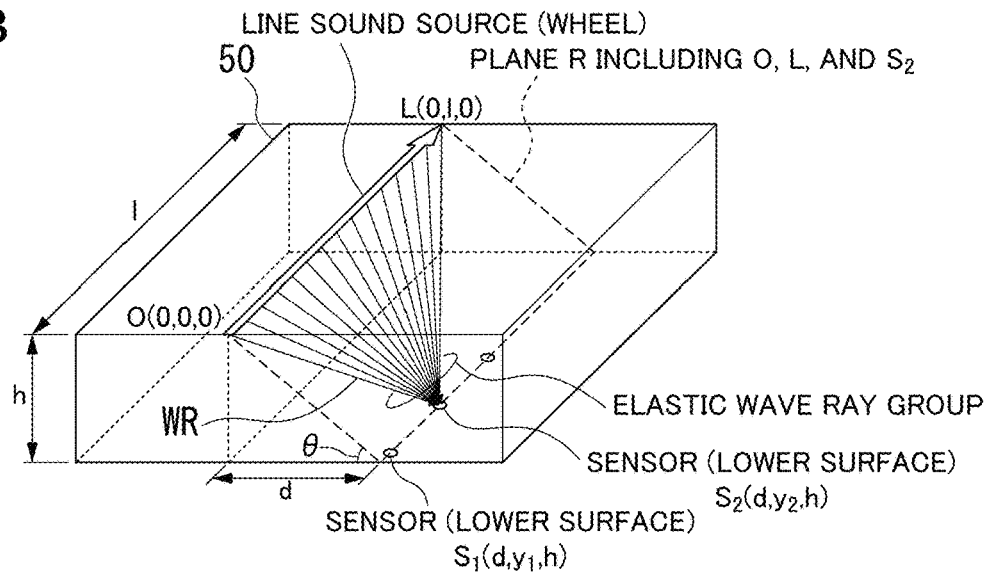
FIG. 4B is a diagram showing a problem of the conventional sensor arrangement.
Figure 4C:
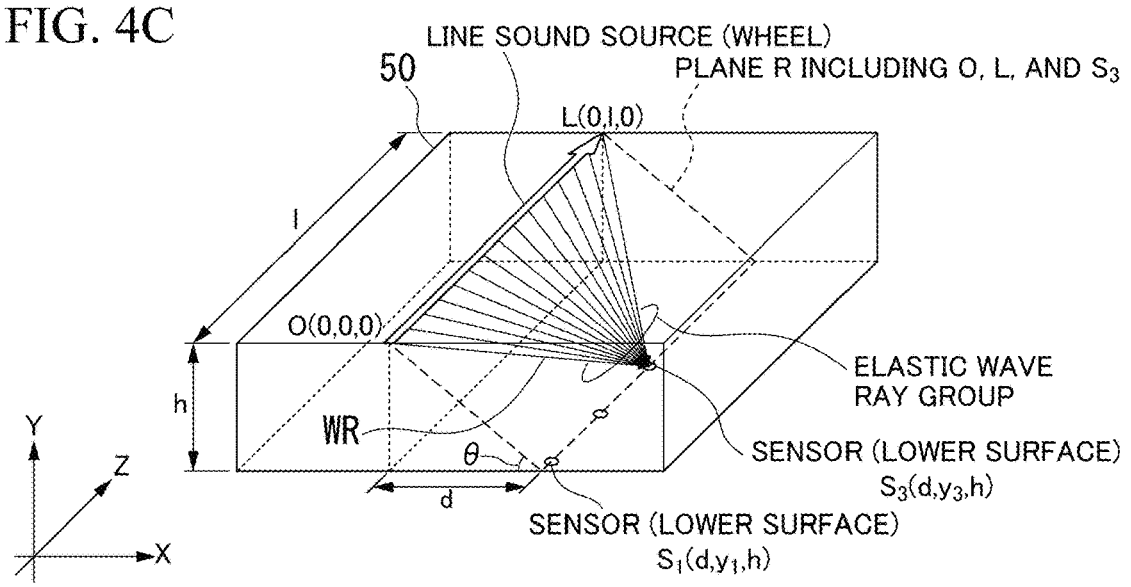
FIG. 4C is a diagram showing a problem of the conventional sensor arrangement.

In an example in which three sensors $S_1$, $S_2$, and $S_3$ are parallel to the Z-axis direction, the elastic wave rays WR of the elastic waves detected by the sensors $S_1$, $S_2$, and $S_3$ are as shown in FIGS. 4A to 4C. As shown in FIGS. 4A to 4C, it can be seen that all the elastic wave rays WR are placed on the same plane R. That is, the elastic wave rays WR directed toward the plurality of sensors S at positions parallel to the line sound source are on the same plane and regions through which the elastic wave rays WR pass overlap. It can be seen that it is necessary to sufficiently reduce the arrangement interval $\Delta d$ of the sensors S in the X-axis direction so that the inspection range is extended.

On the other hand, assuming that the arrangement interval of the sensors S in the Z-axis direction is denoted by $\Delta y$, the sensor S at a distance where $\Delta y$ is small with respect to a line sound source length l has a large overlapping range of elastic wave rays WR and the increased number of sensors will not contribute to extending a valid inspection range even if the number of sensors is increased. Therefore, in the arrangement of the sensors S, a plurality of sensors S are arranged to have a relationship shown in the following Inequality (1)

between the sensor interval Δy in the Z-axis direction and sensor resolution Δd in the X-axis direction, so that it is possible to extend the inspection range without increasing the number of sensors.

$$\Delta d < \Delta y \quad (1)$$

At this time, Δd corresponds to the resolution of the distance from the line sound source and becomes the sensor interval itself when the sensor interval is constant. When the sensor interval varies, for example, it is defined as follows. When there are N sensors $S_1$ to $S_N$, distances between the sensors and the line sound source are $d_1$ to $d_N$. For a sequence in which $d_1$ to $d_N$ are arranged in ascending order of distance, if a difference sequence is $\Delta d_1, \ldots, \Delta d_{N-1}$, the maximum value thereof is defined as $\Delta d = \max\{\Delta d_1, \ldots, \Delta d_N\}$. Also, an average value may be used to set $\Delta d = \text{mean}\{\Delta d_1, \ldots, \Delta d_N\}$.

Figure 5A:
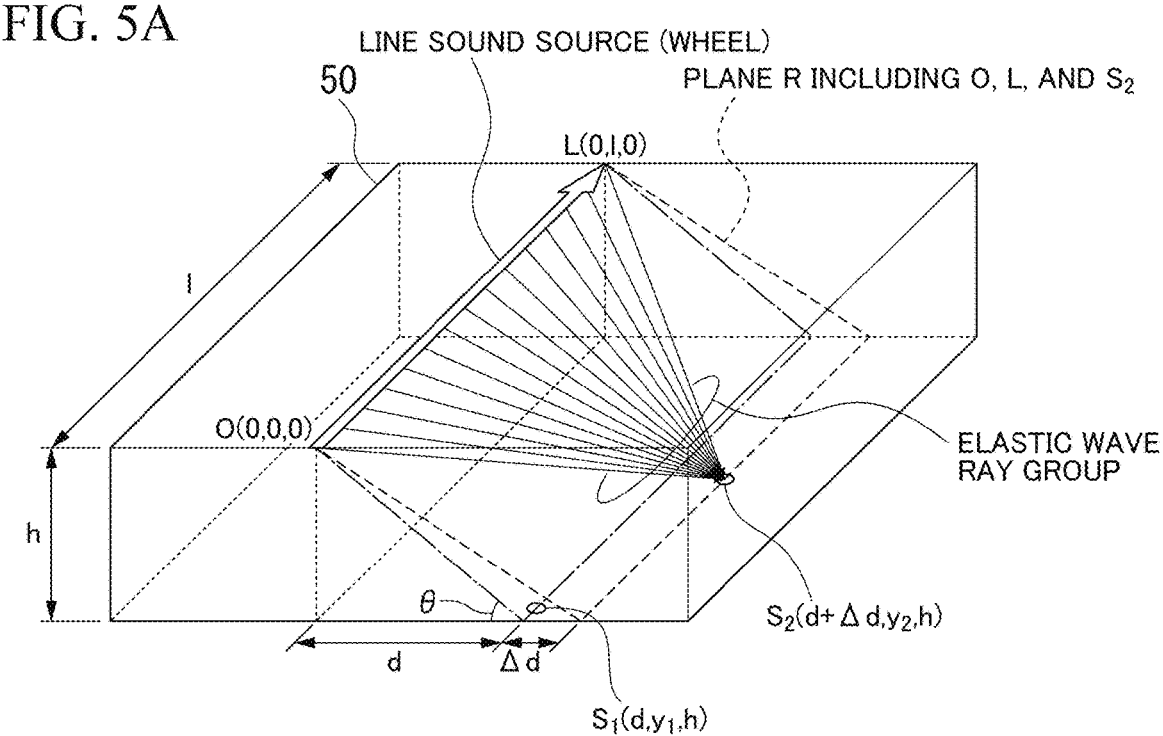
FIG. 5A is a diagram for describing a difference in a wave ray distribution when a sensor interval in an X-axis direction is shifted.
Figure 5B:
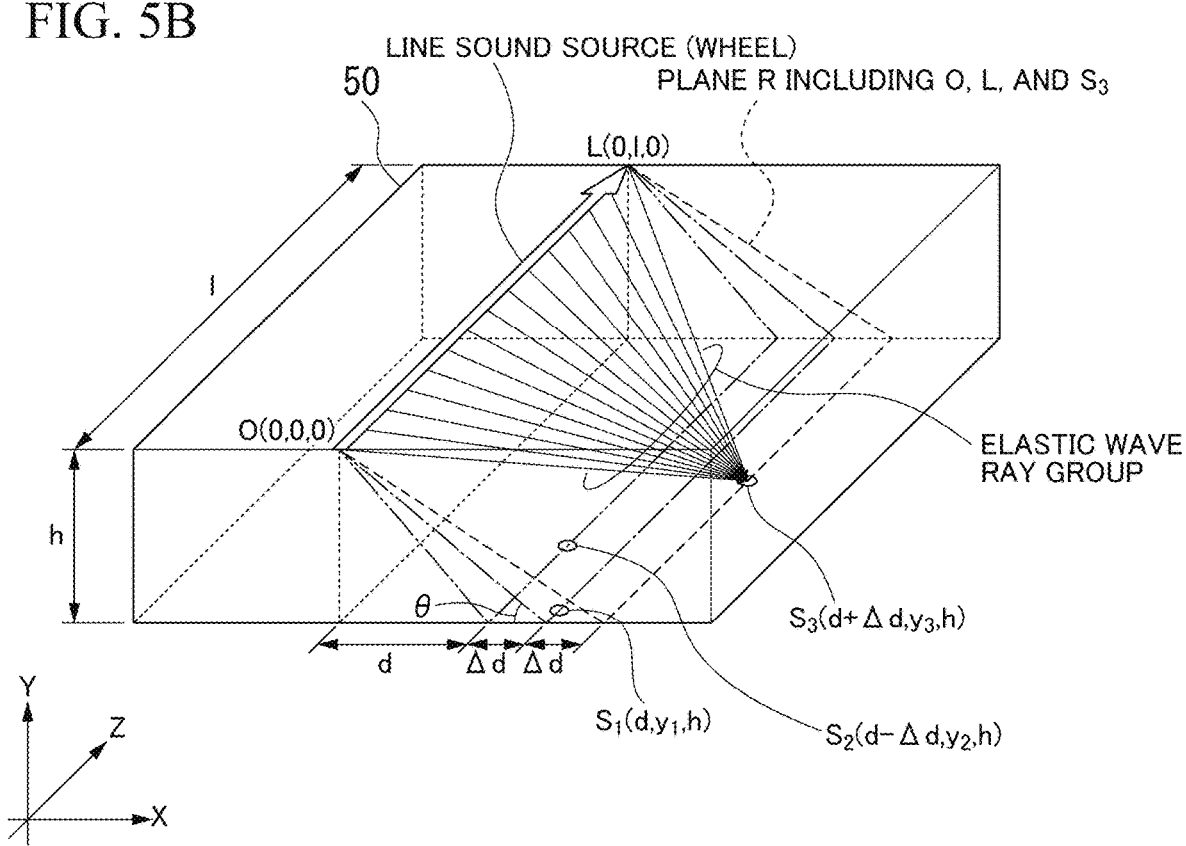
FIG. 5B is a diagram for describing a difference in a wave ray distribution when a sensor interval in an X-axis direction is shifted.

A difference between wave ray distributions when the sensor interval in the X-axis direction has been shifted is shown in FIGS. 5A and 5B. In FIG. 5A, a difference between wave ray distributions when the sensor $S_2$ is arranged at a position (d+Δd, $y_2$, h) shifted by Δd in the X-axis direction from the arrangement position (d, $y_1$, h) of the sensor $S_1$ is shown. In FIG. 5B, a difference between wave ray distributions when the sensor $S_2$ is arranged at a position (d−Δd, $y_2$, h) shifted by −Δd in the X-axis direction from the arrangement position (d, $y_1$, h) of the sensor $S_1$ and the sensor $S_3$ is arranged at a position (d+Δd, $y_3$, h) shifted by Δd in the X-axis direction is shown. Referring to FIGS. 5A and 5B, it can be seen that the inspection range is extended by shifting the arrangement of the sensors $S_2$ and $S_3$ in the X-axis direction, i.e., in the direction orthogonal to the vehicle traveling direction, on the basis of the sensor $S_1$.

Figure 6A:
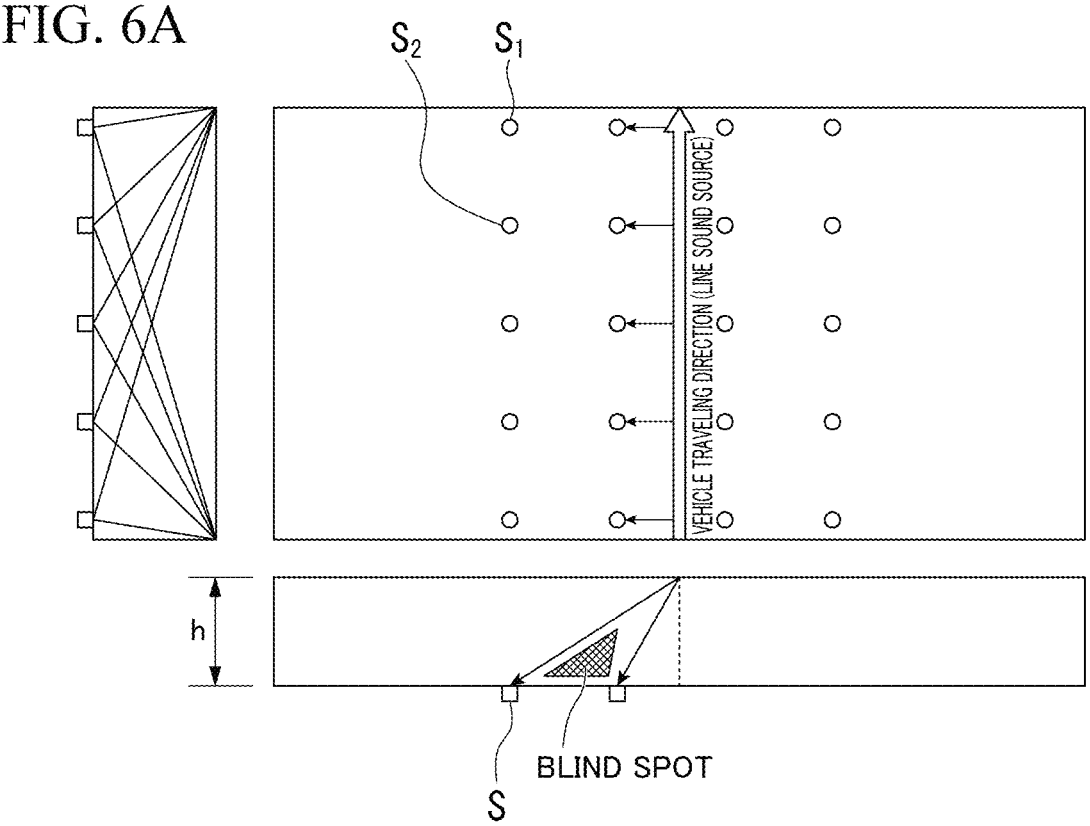
FIG. 6A is a diagram for describing effects when sensors are arranged as shown in FIGS. 5A and 5B.
Figure 6B:
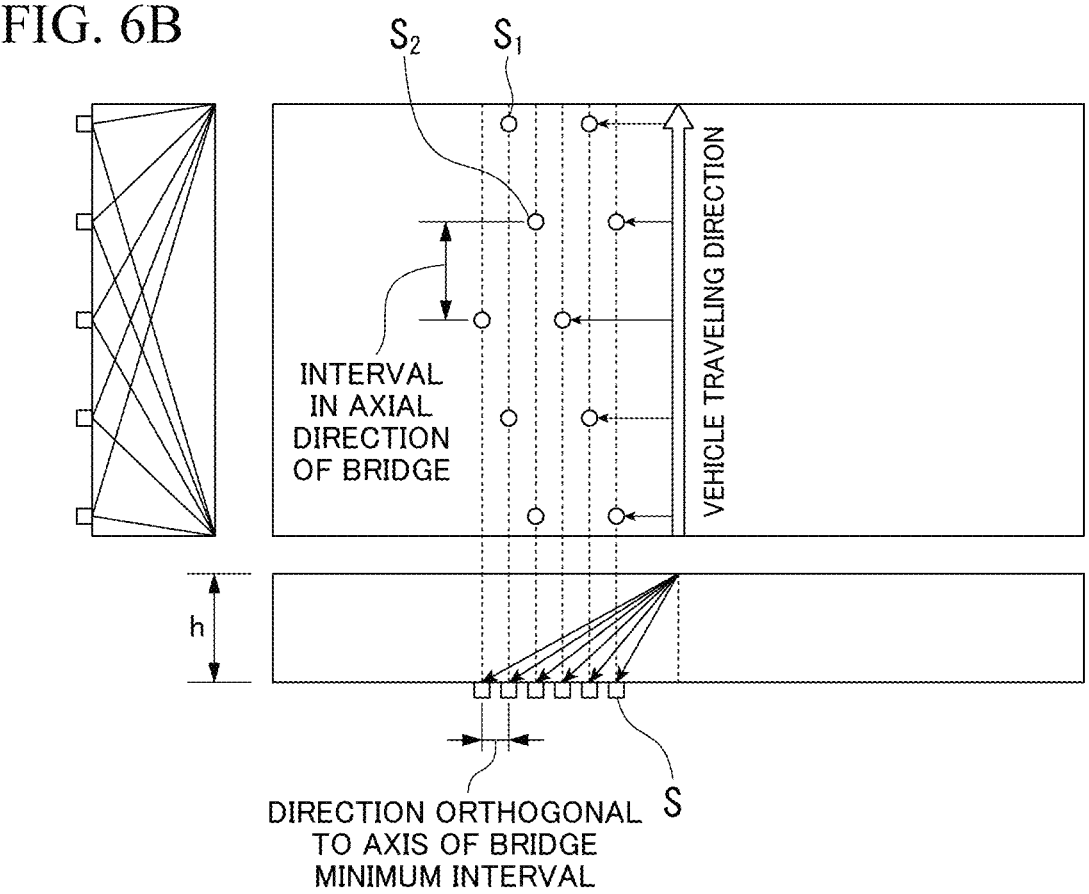
FIG. 6B is a diagram for describing effects when sensors are arranged as shown in FIGS. 5A and 5B.

FIGS. 6A and 6B area diagram for describing effects when the sensors are arranged as shown in FIGS. 5A and 5B. The conventional sensor arrangement is shown in FIG. 6A and the sensor arrangement shown in FIGS. 5A and 5B is shown in FIG. 6B. In FIGS. 6A and 6B, a top view, a side view, and a cross-sectional view are shown. As shown in the top views of FIGS. 6A and 6B, the number of sensors S installed in the vehicle traveling direction is the same and the arrangement of the sensors S in the direction orthogonal to the vehicle traveling direction is different. As a result, as shown in the cross-sectional view, in the conventional sensor arrangement shown in FIG. 6A, elastic wave rays are placed on the same surface when the distance from the line sound source is the same. On the other hand, in the sensor arrangement according to the embodiment shown in FIG. 6B, it can be seen that the elastic wave rays do not overlap by arranging the sensors so that they are distributed at distances from the line sound source. Thereby, it can be seen that the inspection range is extended.

Based on the above points, the specific configuration of the sensor arrangement for extending the inspection range will be described.

(Example 1 of Sensor Arrangement: Rectangular Grid)

Figure 7:
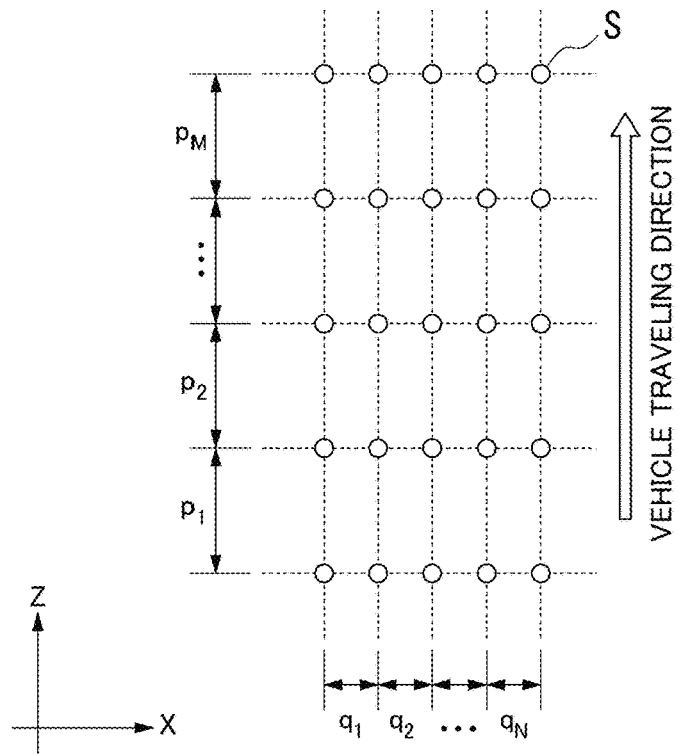
FIG. 7 is a diagram showing a specific example (part 1) of a sensor arrangement for extending an inspection range according to the embodiment.

FIG. 7 is a diagram showing a specific example (part 1) of a sensor arrangement for extending the inspection range according to the embodiment. In FIG. 7, an example in which N×M sensors S (N and M are integers of 2 or more) are arranged in a rectangular grid pattern is shown. When the N×M sensors S are arranged at apexes of the grid portions, the sensor interval in the direction (the X-direction) orthogonal to the vehicle traveling direction (the Z-axis) is denoted by q and the sensor interval in the direction parallel to the vehicle traveling direction is denoted by p, and average sensor intervals thereof are denoted by $\bar{q}$ and $\bar{p}$. $\bar{q}$ and $\bar{p}$ are expressed by the following Eqs. (2).

$$\bar{q} = \frac{1}{N-1}\sum_{n=1}^{N-1} q_n \quad (2)$$

$$\bar{p} = \frac{1}{M-1}\sum_{n=1}^{M-1} p_n$$

The sensor arrangement shown in FIG. 7 is a sensor arrangement characterized in that $\bar{q}$ and $\bar{p}$ in Eqs. (2) satisfy the following relationship.

$$\bar{p} > \bar{q}$$

By making the arrangement as described above, when the number of sensors that is the same as that in the conventional technology is used, the distance in the vehicle traveling direction is longer when the sensors are arranged in the rectangular grid. Thus, when the number of sensors that is the same as that in the conventional technology is used, the detection range of elastic waves in the vehicle traveling direction can be extended as compared with the conventional sensor arrangement (the substantially square grid).

(Example 2 of Sensor Arrangement: Zigzag)

Figure 8:
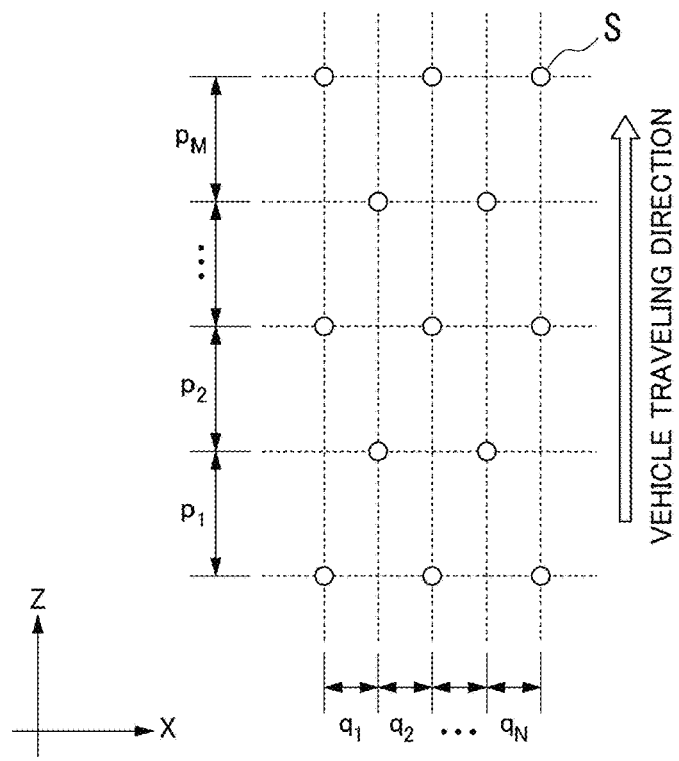
FIG. 8 is a diagram showing a specific example (part 2) of the sensor arrangement for extending the inspection range according to the embodiment.

FIG. 8 is a diagram showing a specific example (part 2) of the sensor arrangement for extending the inspection range according to the embodiment. In FIG. 8, an example in which N×M sensors S are arranged in a zigzag pattern is shown. That is, the sensors S in the vehicle traveling direction are arranged at different positions. That is, in the specific example (part 2) of the sensor arrangement shown in FIG. 8, the sensors S are arranged on N×M grid points and at positions where sensors S are not arranged at the adjacent grid points. The sensor interval in the direction (the X-direction) orthogonal to the vehicle traveling direction (the Z-axis) is denoted by q, the sensor interval in the direction parallel to the vehicle traveling direction is denoted by p, and average sensor intervals thereof are denoted by $\bar{q}$ and $\bar{p}$. $\bar{q}$ and $\bar{p}$ are expressed by the above-described Eqs. (2).

The sensor arrangement shown in FIG. 8 is a sensor arrangement characterized in that $\bar{q}$ and $\bar{p}$ in Eqs. (2) satisfy the following relationship.

$$\vec{p} > \vec{q}$$

By making the arrangement as described above, the detection range of elastic waves can be extended even if the number of sensors is small.

(Example 3 of Sensor Arrangement: Inclined Grid)

Figure 9:
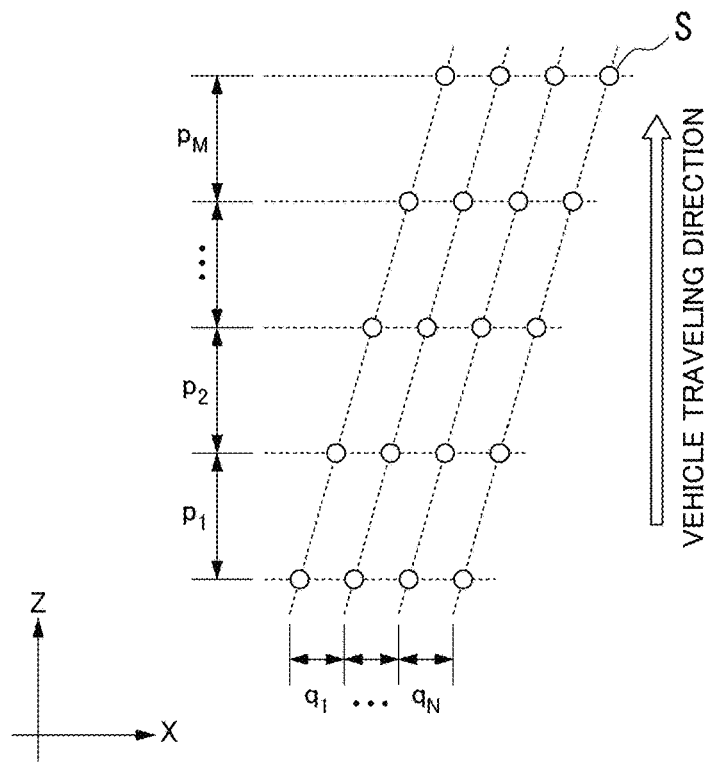
FIG. 9 is a diagram showing a specific example (part 3) of the sensor arrangement for extending the inspection range in the embodiment.

FIG. 9 is a diagram showing a specific example (part 3) of the sensor arrangement for extending the inspection range according to the embodiment. In FIG. 9, an example in which N×M sensors S are arranged at apexes of inclined grid portions is shown. When the N×M sensors S are arranged at the apexes of the inclined grid portions, the sensor interval in the direction (the X-direction) orthogonal to the vehicle traveling direction (the Z-axis) is denoted by q, the sensor interval in the direction parallel to the vehicle traveling direction is denoted by p, and average sensor intervals thereof are denoted by $\bar{q}$ and $\bar{y}$. $\bar{q}$ and $\bar{p}$ are expressed by the above-described Eqs. (2).

The sensor arrangement shown in FIG. 9 is a sensor arrangement characterized in that $\bar{q}$ and $\bar{p}$ in Eqs. (2) satisfy the following relationship.

$$\vec{p} > \vec{q}$$

By making the arrangement as described above, it is possible to reduce the overlap of elastic wave rays when elastic waves propagate to each sensor S as compared with the conventional technology. Thus, when the number of sensors that is the same as that in the conventional technology is used, a detection range of elastic waves can be extended as compared with the conventional sensor arrangement (the substantially square grid).

(Example 4 of Sensor Arrangement: Non-Equidistant Grid)

Figure 10:
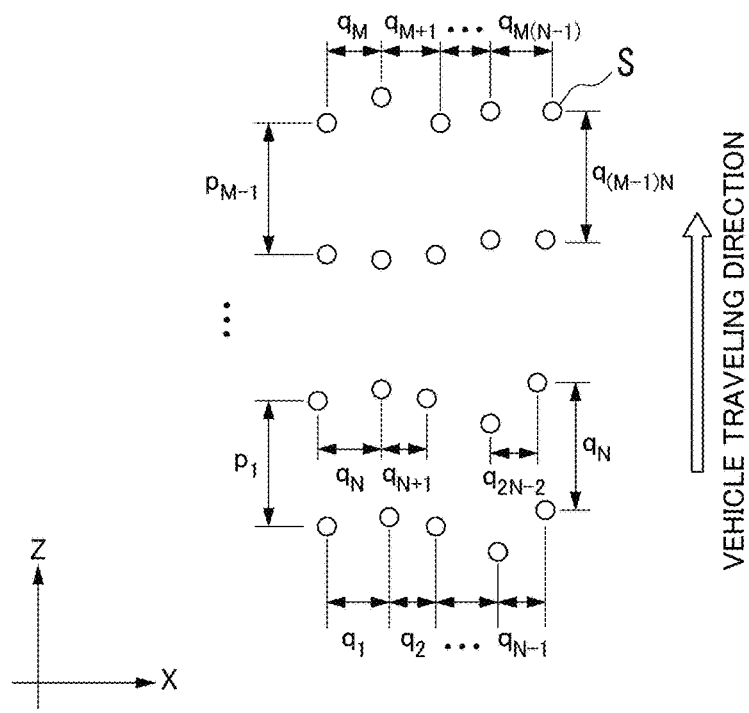
FIG. 10 is a diagram showing a specific example (part 4) of the sensor arrangement for extending the inspection range according to the embodiment.

FIG. 10 is a diagram showing a specific example (part 4) of the sensor arrangement for extending the inspection range according to the embodiment. In FIG. 10, an example in which N×M sensors S are arranged in a non-equidistant grid pattern is shown. In FIG. 10, the vehicle traveling direction is defined as the Z-axis direction, and the direction orthogonal to the vehicle traveling direction is defined as the X-direction. When the N×M sensors S are arranged at apexes of non-equidistant grid portions, the sensor interval in the X-axis direction from the sensor adjacent in the direction orthogonal to the vehicle traveling direction is denoted by q, the sensor interval in the X-axis direction from the sensor adjacent in the direction parallel to the vehicle traveling direction is denoted by p, and average sensor intervals thereof are denoted by $\bar{q}$ and $\bar{p}$. $\bar{q}$ and $\bar{p}$ are expressed by the following Eqs. (3).

$$\bar{q} = \frac{1}{M(N-1)} \sum_{n=1}^{M(N-1)} q_n \qquad (3)$$

$$\bar{p} = \frac{1}{N(M-1)} \sum_{n=1}^{N(M-1)} p_n$$

The sensor arrangement shown in FIG. 10 is a sensor arrangement characterized in that $\bar{q}$ and $\bar{p}$ in Eqs. (3) satisfy the following relationship.

$$\bar{p} > \vec{q}$$

By making the arrangement as described above, it is possible to reduce the overlap of elastic wave rays when elastic waves propagate to each sensor S as compared with the conventional technology. Thus, when the number of sensors that is the same as that in the conventional technology is used, a detection range of elastic waves can be extended as compared with the conventional sensor arrangement (the substantially square grid).

Next, a configuration in which a plurality of sensors S are arranged in any one of the above-described sensor arrangements (part 1) to (part 4) to evaluate the deterioration state of the structure 50 will be described.

First Embodiment

Figure 11:
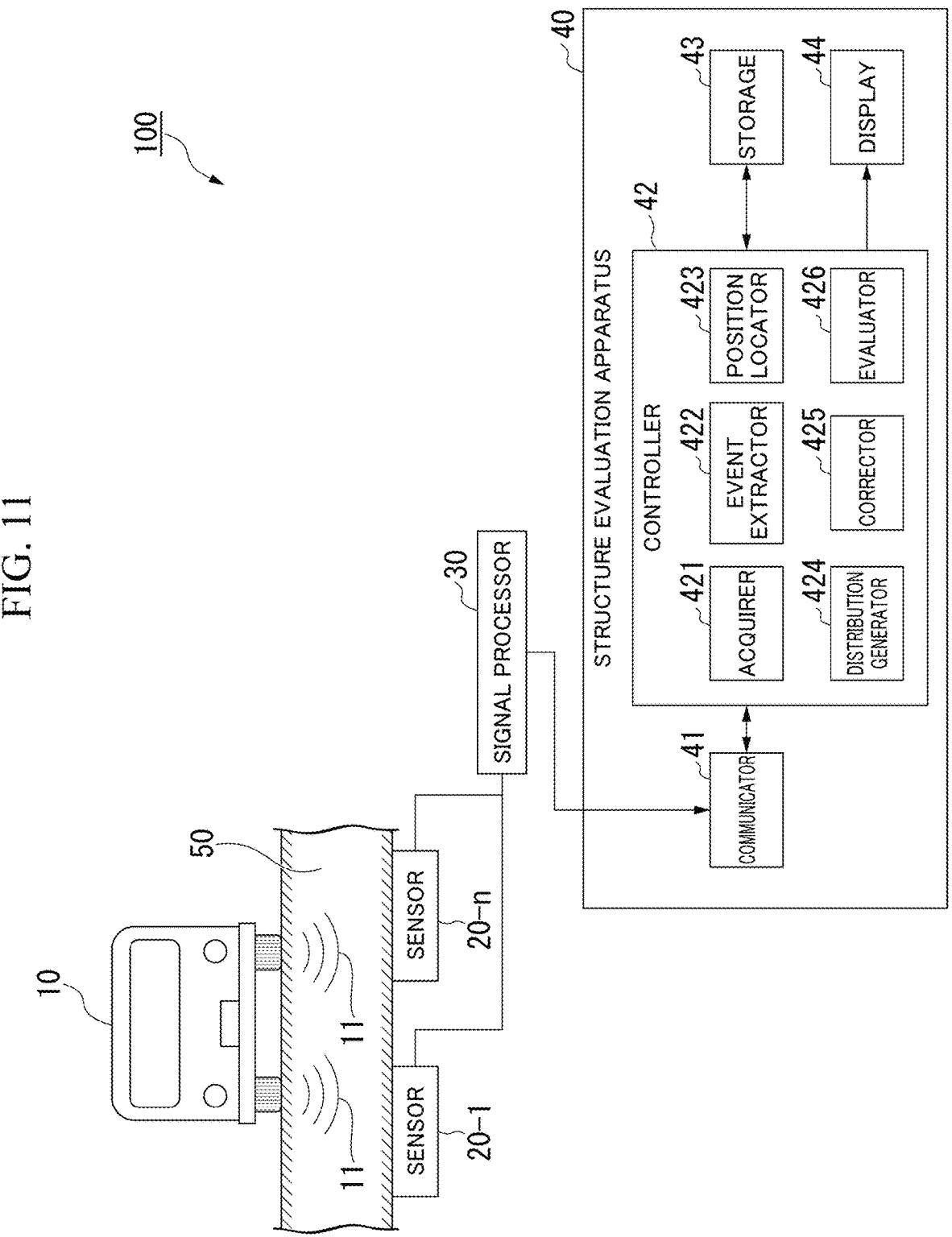
FIG. 11 is a diagram showing a configuration of a structure evaluation system according to a first embodiment.

FIG. 11 is a diagram showing a configuration of a structure evaluation system 100 according to a first embodiment.

The structure evaluation system 100 is used to evaluate the robustness of a structure 50. In the following description, an evaluation process is a process of determining a degree of robustness of the structure 50, i.e., a deterioration state of the structure 50, on the basis of a certain criterion.

Although a bridge made of concrete will be described as an example of the structure 50 in the following description, the structure 50 does not need to be limited to the bridge. The structure 50 may be any structure as long as elastic waves 11 are generated due to the occurrence or growth of cracks or an external impact (for example, rain, artificial rain, or the like). For example, the structure 50 may be bedrock. The bridge is not limited to a structure built over a river or a valley, and includes various structures (for example, a viaduct on an expressway) provided above the ground. A thickness of the structure 50 is, for example, 15 cm or more.

Damage that affects the evaluation of the deterioration state of the structure 50 is, for example, damage inside of the structure that hinders the propagation of elastic waves 11 such as cracks, cavities, and sedimentation. Here, the cracks include vertical cracks, horizontal cracks, oblique cracks, and the like. The vertical cracks are cracks that occur in a vertical direction with respect to a road surface. The horizontal cracks are cracks that occur in a horizontal direction with respect to the road surface. The oblique cracks are cracks that occur in a direction other than the horizontal and vertical directions with respect to the road surface. The sedimentation is deterioration in which concrete changes to a sediment-like form mainly at a boundary between asphalt and a concrete deck.

The structure evaluation system 100 includes a plurality of sensors 20-1 to 20-n, a signal processor 30, and a structure evaluation apparatus 40. Each of the plurality of sensors 20-1 to 20-n and the signal processor 30 are communicatively connected by wire. The signal processor 30 and the structure evaluation apparatus 40 are communicatively connected by wire or wirelessly. Also, in the following description, when the sensors 20-1 to 20-n are not distinguished, they will be referred to as sensors 20. The sensors 20-1 to 20-n correspond to the above-described sensors S. The sensors 20-1 to 20-n are arranged in the structure 50 in any one of the sensor arrangements (part 1) to (part 4).

The sensor 20 has a piezoelectric element and detects elastic waves 11 generated from the inside of the structure 50. The sensor 20 is installed at a position on the surface of the structure 50 where the elastic waves 11 can be detected. For example, the sensors 20 are installed on any surface of the road surface, a side surface, and a bottom surface. The sensor 20 converts the detected elastic waves 11 into an electrical signal. In the following description, a case where the sensor 20 is installed on the bottom surface of the structure 50 will be described as an example.

For the sensor 20, for example, a piezoelectric element having sensitivity in a range of 10 kHz to 1 MHz is used. The sensor 20 is of a type such as a resonance type having a resonance peak in a frequency range or a wide band type in which resonance is limited, and the sensor 20 may be of any type. Methods in which the sensor 20 detects the elastic waves 11 include a voltage output type, a resistance change type, an electrostatic capacitance type, and the like, but any detection method may be used.

An acceleration sensor may be used instead of the sensor 20. In this case, the acceleration sensor detects the elastic waves 11 generated inside of the structure 50. The acceleration sensor converts the detected elastic waves 11 into an electrical signal by performing the same process as the sensor 20.

For example, an amplifier and an analog-to-digital (A/D) converter (not shown) are provided between the sensor 20 and the signal processor 30.

The amplifier amplifies the electrical signal output from the sensor 20. The amplifier outputs the amplified electrical signal to the A/D converter. The amplifier amplifies the electrical signal to an extent that the electrical signal can be processed by, for example, the A/D converter.

The A/D converter quantizes the amplified electrical signal and converts the quantized amplified electrical signal into a digital signal. The A/D converter outputs the digital signal to the signal processor 30.

The signal processor 30 inputs a digital signal output from the A/D converter. The signal processor 30 performs signal processing on the input digital signal. The signal processing performed by the signal processor 30 is, for example, noise removal, parameter extraction, and the like. The signal processor 30 generates transmission data including a digital signal after the signal processing. The signal processor 30 outputs the generated transmission data to the structure evaluation apparatus 40.

The signal processor 30 is configured using an analog circuit or a digital circuit. The digital circuit is implemented by, for example, a field-programmable gate array (FPGA) or a microcomputer. The digital circuit may be implemented by a dedicated large-scale integration (LSI) circuit. Also, the signal processor 30 may be equipped with a non-volatile memory such as a flash memory or a removable memory.

Figure 12:
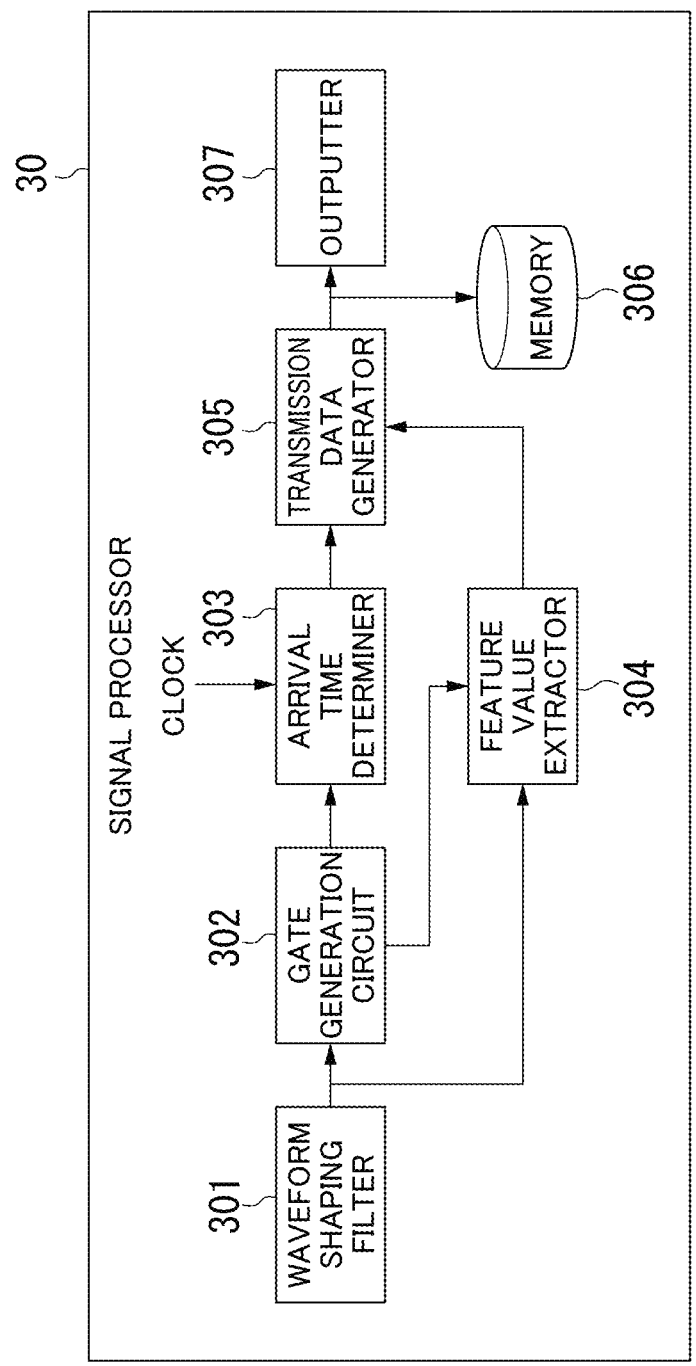
FIG. 12 is a schematic block diagram showing a function of a signal processor according to the first embodiment.

FIG. 12 is a schematic block diagram showing functions of the signal processor 30 according to the first embodiment. The signal processor 30 includes a waveform shaping filter 301, a gate generation circuit 302, an arrival time determiner 303, a feature value extractor 304, a transmission data generator 305, a memory 306, and an outputter 307.

The waveform shaping filter 301 removes noise components outside of a prescribed band from the input digital signal. The waveform shaping filter 301 is, for example, a digital bandpass filter (BPF). The waveform shaping filter 301 outputs a digital signal after noise component removal (hereinafter referred to as a "noise-removed signal") to the gate generation circuit 302 and the feature value extractor 304.

The gate generation circuit 302 receives an input of the noise-removed signal output from the waveform shaping filter 301. The gate generation circuit 302 generates a gate signal on the basis of the input noise-removed signal. The gate signal is a signal indicating whether or not a waveform of the noise-removed signal is sustained.

The gate generation circuit 302 is implemented by, for example, an envelope detector and a comparator. The envelope detector detects the envelope of the noise-removed signal. The envelope is extracted, for example, by squaring the noise-removed signal and performing a prescribed process (for example, a process using a low-pass filter or a Hilbert transform) on a squared output value. The comparator determines whether or not the envelope of the noise-removed signal is greater than or equal to a prescribed threshold value.

When the envelope of the noise-removed signal becomes greater than or equal to the prescribed threshold value, the gate generation circuit 302 outputs a first gate signal indicating that a waveform of the noise-removed signal is sustained to the arrival time determiner 303 and the feature value extractor 304. On the other hand, when the envelope of the noise-removed signal becomes less than the prescribed threshold value, the gate generation circuit 302 outputs a second gate signal indicating that the waveform of the noise-removed signal is not sustained to the arrival time determiner 303 and the feature value extractor 304.

The arrival time determiner 303 receives inputs of a clock output from a clock source such as a crystal oscillator (not shown) and a gate signal output from the gate generation circuit 302. The arrival time determiner 303 determines an arrival time of the elastic waves using the clock input while the first gate signal is input. The arrival time determiner 303 outputs the determined arrival time of the elastic waves as time point information to the transmission data generator 305. The arrival time determiner 303 does not perform a process while the second gate signal is being input. The arrival time determiner 303 generates cumulative time point information from the time when a power supply is turned on, on the basis of the signal from the clock source. Specifically, the arrival time determiner 303 may be a counter that counts the edges of the clock and a value of the register of the counter may be used as the time point information. The register of the counter is determined to have a prescribed bit length.

The feature value extractor 304 receives inputs of the noise-removed signal output from the waveform shaping filter 301 and the gate signal output from the gate generation circuit 302. The feature value extractor 304 extracts a feature value of the noise-removed signal using the noise-removed signal input while the first gate signal is input. The feature value extractor 304 does not perform a process while the second gate signal is input. The feature value is information indicating the feature of the noise-removed signal.

Feature quantities include, for example, an amplitude [mV] of the waveform, a rising time [sec] of the waveform, the duration [µsec] of the gate signal, a zero-crossing count number [times], and the energy [arb.] of the waveform, a frequency [Hz], a root mean square (RMS) value, and the like. The feature value extractor 304 outputs a parameter related to the extracted feature value to the transmission data generator 305. When the parameter related to the feature value is output, the feature value extractor 304 associates a sensor ID with the parameter related to the feature value. The sensor ID represents identification information for identifying the sensor 20 installed in a region (hereinafter referred to as an "evaluation region") serving as an evaluation target for the robustness of the structure 50.

The amplitude of the waveform is, for example, a value of the maximum amplitude in the noise-removed signal. A rising time period of the waveform is, for example, a time period T1 from the start of the rising of the gate signal to the time when the noise-removed signal reaches the maximum value. The duration of the gate signal is, for example, a time period from the start of the rising of the gate signal to the time when the amplitude becomes smaller than a preset value. The zero-crossing count number is, for example, the number of times the noise-removed signal crosses a reference line passing through the zero value.

The energy of the waveform is, for example, a value obtained by time-integrating the square of the amplitude of the noise-removed signal at each time point.

The definition of energy is not limited to the above example and the energy may be approximated using, for example, the envelope of the waveform. The frequency is a frequency of the noise-removed signal. The RMS value is, for example, a value obtained by squaring the amplitude of the noise-removed signal and finding the square root of the squared amplitude at each time point.

The transmission data generator 305 receives inputs of a sensor ID, time point information, and a parameter related to a feature value. The transmission data generator 305 generates transmission data including the input sensor ID, the input time point information, and the input parameter related to the feature value.

The memory 306 stores the transmission data. The memory 306 is, for example, a dual-port random access memory (RAM).

The outputter 307 sequentially outputs the transmission data stored in the memory 306 to the structure evaluation apparatus 40.

Description will be continuously given by returning to FIG. 11.

The structure evaluation apparatus 40 includes a communicator 41, a controller 42, a storage 43, and a display 44.

The communicator 41 receives the transmission data output from the signal processor 30.

The controller 42 controls the entire structure evaluation apparatus 40. The controller 42 is configured using a processor such as a central processing unit (CPU) and a memory. By executing the program, the controller 42 functions as an acquirer 421, an event extractor 422, a position locator 423, a distribution generator 424, a corrector 425, and an evaluator 426.

Some or all of the functional units of the acquirer 421, the event extractor 422, the position locator 423, the distribution generator 424, the corrector 425, and the evaluator 426 may be implemented by hardware such as an application-specific integrated circuit (ASIC), a programmable logic device (PLD), or an FPGA or may be implemented by software and hardware in cooperation. The program may be recorded on a computer-readable recording medium. The computer-readable recording medium is, for example, a non-transitory storage medium such as a flexible disk, a magneto-optical disk, a ROM, a portable medium such as a CD-ROM, or a storage device such as a hard disk built in a computer system. The program may be transmitted via a telecommunication circuit.

Some of the functions of the acquirer 421, the event extractor 422, the position locator 423, the distribution generator 424, the corrector 425, and the evaluator 426 do not need to be mounted in the structure evaluation apparatus 40 in advance and may be implemented by installing an additional application program in the structure evaluation apparatus 40.

The acquirer 421 acquires various types of information. For example, the acquirer 421 acquires the transmission data received by the communicator 41. The acquirer 421 stores the acquired transmission data in the storage 43. In the first embodiment, the acquirer 421 acquires information (hereinafter referred to as "vehicle information") about the vehicle 10 traveling on the structure 50 serving as an evaluation target for a prescribed period.

The vehicle information is, for example, vehicle type information of the vehicle 10 that has traveled on the structure 50 for a prescribed period and traffic volume information of the vehicle 10 of the structure 50. The vehicle type information of the vehicle 10 includes at least information of a tread width of the vehicle 10. The traffic volume information of the vehicle 10 is information indicating how many vehicles 10 of which vehicle type have passed over the structure 50 for a prescribed period. The acquirer 421 may acquire vehicle information input by a user or may acquire vehicle information from a server that stores traffic information.

The event extractor 422 extracts the transmission data in one event from the transmission data stored in the storage 43. The event is an elastic wave generation event that has occurred in the structure 50. The elastic wave generation event according to the present embodiment is an event in which the vehicle 10 passes over the road surface. When one event has occurred, the elastic waves 11 are detected by the plurality of sensors 20 at substantially the same time point. That is, the storage 43 stores the transmission data related to the elastic waves 11 detected at substantially the same time point. Therefore, the event extractor 422 provides a prescribed time window and extracts all transmission data whose arrival time is within a range of the time window as transmission data in one event. The event extractor 422 outputs the transmission data in one extracted event to the position locator 423.

A range Tw of a time window may be determined so that the range Tw is in the range of $Tw \geq dmax/v$ using an elastic wave propagation velocity v in the target structure 50 and a maximum sensor interval dmax. Because it is desirable to set Tw to a value as small as possible so that erroneous detection is avoided, $Tw=dmax/v$ can be substantially set. The elastic wave propagation velocity v may be obtained in advance.

The position locator 423 performs a position location process on an elastic wave source on the basis of sensor position information and a sensor ID and time point information included in each of a plurality of pieces of transmission data extracted by the event extractor 422.

The sensor position information includes information about an installation position of the sensor 20 in association with the sensor ID. The sensor position information includes information about an installation position of the sensor 20, such as latitude and longitude, or distances from a reference position of the structure 50 in the horizontal and vertical directions. The position locator 423 retains the sensor position information in advance. The sensor position information may be stored in the position locator 423 at any timing before the position locator 423 performs the position location process on the elastic wave source.

The sensor position information may be stored in the storage 43. In this case, the position locator 423 acquires the sensor position information from the storage 43 at the timing when the position location process is performed. A Kalman filter, a least-squares method, or the like may be used to locate the position of the elastic wave source. The position locator 423 outputs the position information of the elastic wave source obtained for a measurement period to the distribution generator 424.

The distribution generator 424 receives inputs of position information of a plurality of elastic wave sources output from the position locator 423. The distribution generator 424 generates an elastic wave source distribution using the input position information of the plurality of elastic wave sources. The elastic wave source distribution represents a distribution in which positions of the elastic wave sources are shown. More specifically, the elastic wave source distribution is a distribution in which points representing positions of elastic wave sources are shown on ideal data representing the structure 50 serving as the evaluation target when the horizontal axis represents a distance in a passing direction and the vertical axis represents a distance in a width direction. The distribution generator 424 generates an elastic wave source density distribution using the elastic wave source distribution. For example, the distribution generator 424 generates the elastic wave source density distribution by representing the position of the elastic wave source in a contour diagram.

The corrector 425 corrects information based on the position location process of the position locator 423 using a correction value determined in accordance with the impact. The correction value determined in accordance with the impact in the first embodiment is a correction value obtained from the vehicle information acquired by the acquirer 421. The correction value has an extreme value at a passing position of the traveling portion of the vehicle 10. The information based on the position location process is information (for example, the amplitude of the elastic waves) obtained before the position location process or using a position location result. For example, the information based on the position location process is the elastic wave source density distribution. In the following description, a case where the information based on the position location process is the elastic wave source density distribution will be described as an example.

The evaluator 426 evaluates a deterioration state of the structure 50 on the basis of the corrected information. Specifically, the evaluator 426 evaluates the deterioration state of the structure 50 using a corrected elastic wave source density distribution. For example, the evaluator 426 evaluates a region where the density of the elastic wave sources is greater than or equal to a threshold value as a robust region and evaluates a region where the density of the elastic wave sources is less than the threshold value as a damaged region. A region through which an elastic wave ray indicating the propagation path of the elastic waves between the elastic wave source and each sensor 20 passes is the evaluation region. Therefore, the evaluator 426 evaluates the deterioration state of the structure within the evaluation region.

The storage 43 stores the transmission data and the vehicle information acquired by the acquirer 421. The storage 43 is configured using a storage device such as a magnetic hard disk device or a semiconductor storage device.

The display 44 displays an evaluation result in accordance with the control of the evaluator 426. Further, the display 44 displays an elastic wave ray group indicating the propagation path of the elastic waves between the elastic wave source and each sensor 20 in, for example, a projection method, in accordance with the control of the evaluator 426. The display 44 is an image display device such as a liquid crystal display or an organic electro-luminescence (EL) display. The display 44 may be an interface for connecting the image display device to the structure evaluation apparatus 40. In this case, the display 44 generates a video signal for displaying the evaluation result and outputs the video signal to an image display device connected to the display 44.

Figure 13:
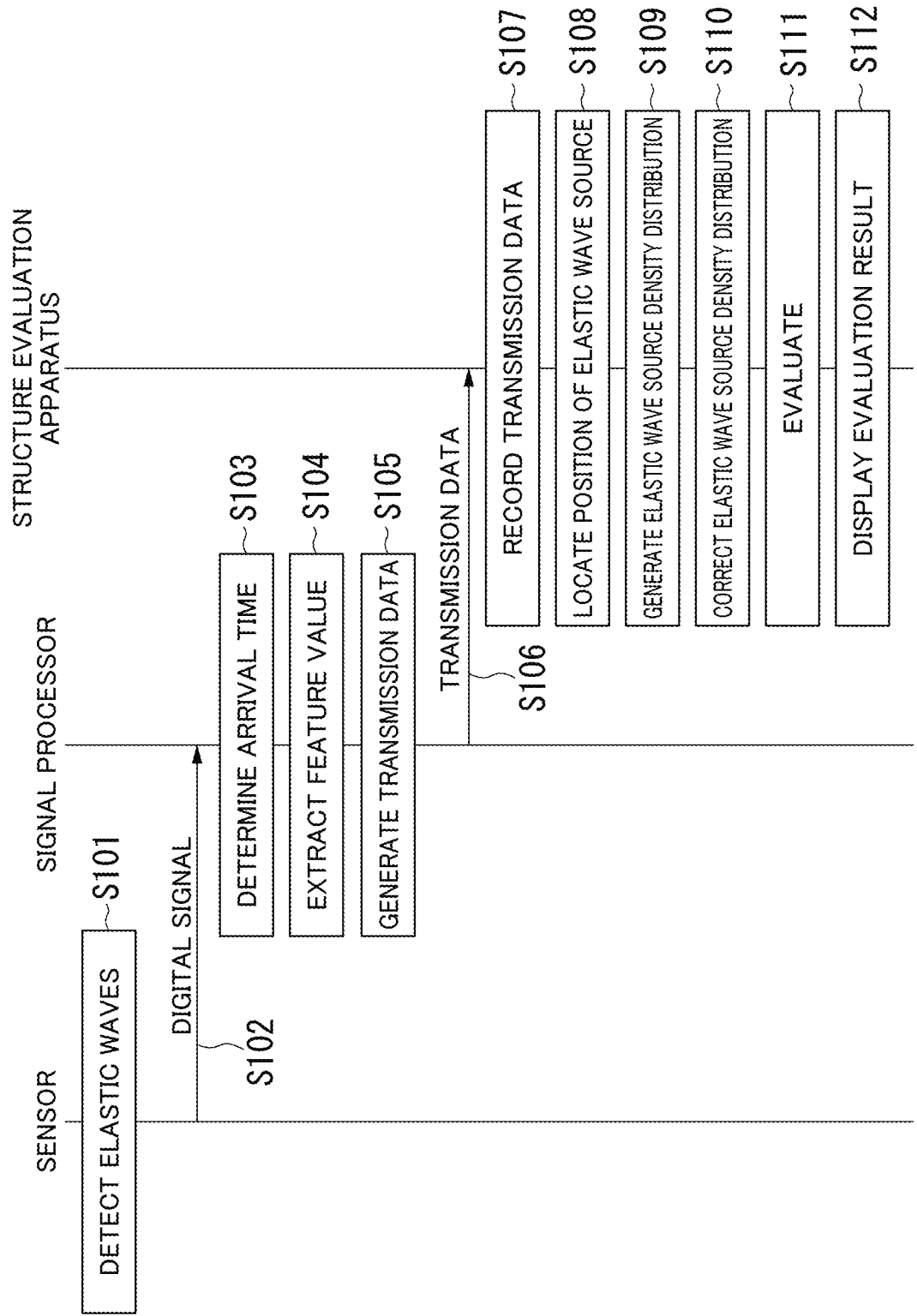
FIG. 13 is a sequence diagram showing a flow of a deterioration state evaluation process of the structure evaluation system according to the first embodiment.

FIG. 13 is a sequence diagram showing a flow of a deterioration state evaluation process of the structure evaluation system 100 according to the first embodiment. The process of FIG. 13 is executed according to the vehicle 10 traveling on the structure 50 serving as the evaluation target.

When the vehicle 10 travels on the structure 50 serving as the evaluation target, the traveling portion of the vehicle 10 comes into contact with the road surface. Thereby, elastic waves 11 are generated within the structure 50. Each of the plurality of sensors 20 detects the elastic waves 11 generated within the structure 50 (step S101). Each of the plurality of sensors 20 converts the detected elastic waves 11 into an electrical signal and outputs the electrical signal to the signal processor 30 (step S102). The electrical signal output from each of the plurality of sensors 20 is amplified by an amplifier (not shown). The amplified electrical signal is converted into a digital signal by an A/D converter.

The signal processor 30 inputs the digital signal output from the A/D converter. The arrival time determiner 303 of the signal processor 30 determines the arrival time of the elastic waves 11 (step S103). Specifically, the arrival time determiner 303 determines the elastic-wave arrival time using the clock input while a first gate signal is input. The arrival time determiner 303 outputs the determined elastic-wave arrival time as time point information to the transmission data generator 305. The arrival time determiner 303 performs this process on all input digital signals.

The feature value extractor 304 of the signal processor 30 extracts a feature value of the noise-removed signal using the noise-removed signal which is a digital signal input while the first gate signal is input (step S104). The feature value extractor 304 outputs a parameter related to the extracted feature value to the transmission data generator 305. The transmission data generator 305 generates transmission data including a sensor ID, time point information, and the parameter related to the feature value (step S105). The outputter 307 sequentially outputs the transmission data to the structure evaluation apparatus 40 (step S106).

The communicator 41 of the structure evaluation apparatus 40 receives the transmission data output from the signal processor 30. The acquirer 421 acquires the transmission data received by the communicator 41. The acquirer 421 records the acquired transmission data in the storage 43 (step S107). The event extractor 422 extracts the transmission data in one event from the transmission data stored in the storage 43. The event extractor 422 outputs the transmission data in one extracted event to the position locator 423 and the distribution generator 424.

The position locator 423 locates a position of the elastic wave source on the basis of the sensor ID and the time point information included in the transmission data output from the event extractor 422 and the sensor position information retained in advance (step S108). Specifically, the position locator 423 first calculates differences between arrival times of the elastic waves 11 for the plurality of sensors 20. Next, the position locator 423 locates a position of the elastic wave source using the sensor position information and information of the differences between the arrival times.

The position locator 423 executes the processing of step S108 every time the transmission data of one event is output from the event extractor 422 for a measurement period. Thereby, the position locator 423 locates positions of the plurality of elastic wave sources. The position locator 423 outputs position information of the plurality of elastic wave sources to the distribution generator 424.

The distribution generator 424 generates an elastic wave source distribution using the position information of the plurality of elastic wave sources output from the position locator 423. Specifically, the distribution generator 424 generates the elastic wave source distribution by plotting the positions of the elastic wave sources indicated in the obtained position information of the plurality of elastic wave sources on virtual data. The distribution generator 424 generates an elastic wave source density distribution by representing the generated elastic wave source distribution in a contour diagram (step S109). The distribution generator 424 outputs the generated elastic wave source density distribution to the corrector 425.

The corrector 425 inputs the elastic wave source density distribution output from the distribution generator 424 and the vehicle information stored in the storage 43. The corrector 425 corrects the elastic wave source density distribution with a correction value obtained using the input vehicle information (step S110).

Specifically, the corrector 425 first calculates a correction value f(x, y) on the basis of the following Eq. (4) using the vehicle information.

$$f(x, y) = 1 - k\left(e^{-2\left(\frac{y-a}{w}\right)^2}\right) \quad (4)$$

In Inequality (1), y denotes a distance in the width direction of the road, k denotes a coefficient, a denotes a traveling portion position, and w denotes a degree of variation at a passing position. The correction value obtained by Inequality (1) becomes a distribution having a peak at the passing position of the traveling portion that is a y-direction and having a constant value in the passing direction that is an x-direction. It is possible to refer to a tread width of the vehicle 10 included in the vehicle information as the position of the traveling portion used at the time of correction.

In the case of a large vehicle that is thought to generate many elastic waves 11, the tread width is about 1900 mm in a 10-ton truck. Thus, the traveling portion position a can be set to a position at a distance of ±950 mm from the center of a lane. In the case of a normal vehicle, the tread width is about 1500 mm. Thus, the traveling portion position a can be set to a position at a distance of ±750 mm from the center of the lane.

It is also possible to determine the position of the traveling portion in accordance with a traffic state of the structure 50 serving as the evaluation target. When the structure 50 serving as the evaluation target is a road over which a large vehicle does not pass, for example, a tread width of about 1500 mm for a normal vehicle may be adopted and its traveling portion position can be set to a position at a distance of ±750 mm from the center of the lane. Information of the traffic state of the structure 50 may be externally input to the structure evaluation apparatus 40 or may be included in the vehicle information.

The corrector 425 may determine the traveling portion position a on the basis of a statistical value of the vehicle type information included in the vehicle information. For example, the corrector 425 may designate a tread width of a vehicle type having the largest number of times of passing as the traveling portion position a from a statistical result of the vehicle type information included in the vehicle information. For example, the corrector 425 may designate the tread width of the vehicle having the largest tread width as the traveling portion position a, or may designate an average tread width as the traveling portion position a, from statistical results of the vehicle type information included in the vehicle information.

The variation in the passing position can be determined according to a state of the structure 50 serving as the evaluation target. For example, on an expressway or a road having a wide road width, the variation in the passing position of each vehicle 10 becomes large. On the other hand, on a narrow road where only one vehicle 10 can pass, all vehicles pass at substantially the same position, so that the variation is small. Therefore, the corrector 425 appropriately sets a parameter related to the degree of variation at a passing position with reference to traffic volume information, a road width, a frequency of a lane change, and the like.

Figure 14:
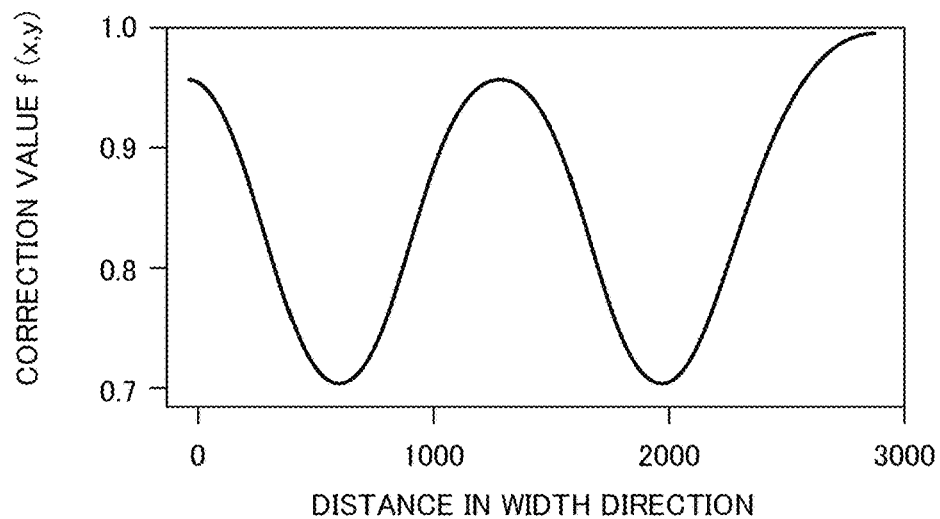
FIG. 14 is a diagram showing an example of a correction value according to the first embodiment.

An example of the correction value calculated on the basis of the above-described Eq. (4) is shown in FIG. 14. In FIG. 14, the horizontal axis represents a distance in the width direction and the vertical axis represents a correction value f(x, y). As shown in FIG. 14, the correction value f(x, y) is represented by a distribution having a value for reducing at least a value (for example, a density) of a position on the elastic wave source density distribution corresponding to the passing position of the traveling portion of the vehicle 10. That is, the correction value f(x, y) is represented by a distribution in which a value of a position on the elastic wave source density distribution corresponding to the passing position of the traveling portion of the vehicle 10 is minimized and the value of the position does not decrease as a distance from the passing position increases.

In FIG. 14, an example of a correction value f(x, y) when there are two passing positions of the traveling portion of the vehicle 10 is shown. Thus, the correction value f(x, y) shown in FIG. 14 has two values for minimizing the value of the position on the elastic wave source density distribution corresponding to the passing position of the traveling portion of the vehicle 10. According to the evaluation region, there may be one passing position of the traveling portion of the vehicle 10. Thus, it is only necessary for the correction value f(x, y) to have one or more values for minimizing the value of the position on the elastic wave source density distribution corresponding to the passing position of the traveling portion of the vehicle 10.

The corrector 425 corrects the elastic wave source density distribution by multiplying the elastic wave source density distribution by the calculated correction value f(x, y). Specifically, the corrector 425 multiplies the elastic wave source density distribution by the correction value f(x, y) according to a distance in the width direction of the calculated correction value f(x, y) with respect to the width direction of the elastic wave source density distribution.

For example, the corrector 425 multiplies the elastic wave source density distribution by the correction value f(x, y) according to the position of the distance "500" of the calculated correction value f(x, y) with respect to a value of a density of a position of a distance "500" in the width direction of the elastic wave source density distribution. Likewise, the corrector 425 also multiplies the elastic wave source density distribution by the correction value f(x, y) according to the distance in the width direction with respect to the passing direction of the elastic wave source density distribution. For example, the corrector 425 multiplies the elastic wave source density distribution by the correction value f(x, y) according to the position of the distance "500" of the calculated correction value f(x, y) in the width direction with respect to all density values at positions of distances "0 to 3000" in the passing direction corresponding to the position of the distance "500" in the width direction of the elastic wave source density distribution.

Figure 15:
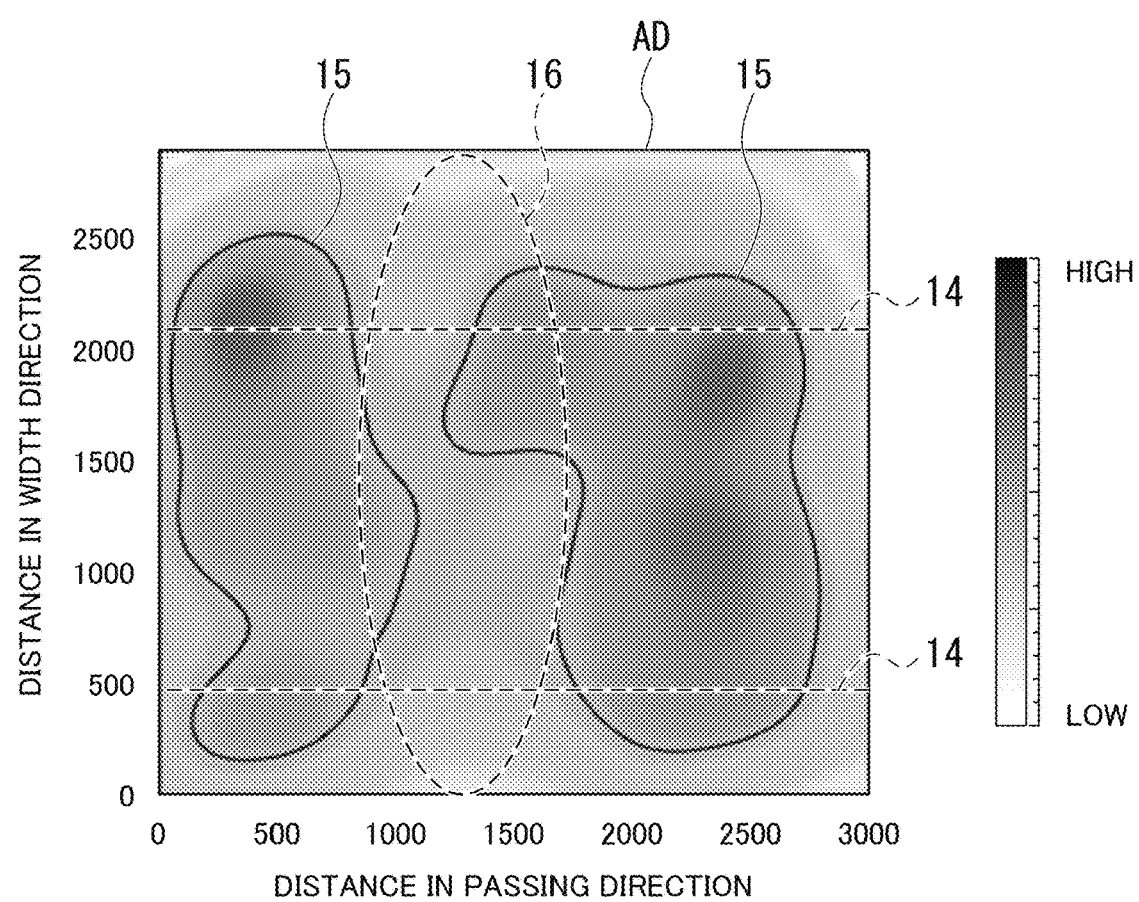
FIG. 15 is a diagram showing an example of an elastic wave source density distribution after correction.

The corrector 425 generates a corrected elastic wave source density distribution AD shown in FIG. 15 by correcting the elastic wave source density distribution according to the above-described process. The corrector 425 outputs the corrected elastic wave source density distribution AD to the evaluator 426.

FIG. 15 is a diagram showing an example of the corrected elastic wave source density distribution AD. In FIG. 15, the horizontal axis represents a distance of the vehicle in the passing direction and the vertical axis represents a distance in the width direction. It can be seen that the corrected elastic wave source density distribution AD shown in FIG. 15 is less affected by the passing of the traveling portion of the vehicle 10 than the elastic wave source density distribution D. An influence of the passing of the traveling portion of the vehicle 10 is that the density of the elastic wave sources at the position where the traveling portion of the vehicle 10 has passed increases. The evaluator 426 evaluates the deterioration state of the structure 50 using the corrected elastic wave source density distribution AD output from the corrector 425 (step S111).

The evaluator 426 evaluates a region having a density less than the threshold value 15 set in the corrected elastic wave source density distribution AD in the conventional evaluation method as a damaged region. The evaluator 426 outputs an evaluation result to the display 44. The display 44 displays the evaluation result output from the evaluator 426 (step S112). For example, the display 44 may display the corrected elastic wave source density distribution as the evaluation result or may display a region that is considered to be a damaged region in a display mode different from those of other regions. Further, the evaluator 426 may cause the display 44 to display an elastic wave ray group indicating the propagation path of the elastic waves from the elastic wave source to each sensor 20 according to a projection method on the basis of the elastic wave source whose position is located by the position locator 423 and the installation position information of each sensor 20. Thereby, it is possible to display, for example, an elastic wave ray group WR shown in FIG. 1B. Also, the evaluator 426 may display the elastic wave ray group in three dimensions.

In the structure evaluation system 100 configured as described above, it is possible to detect elastic waves in a wider range as compared with conventional technology even if the number of sensors 20 that is the same as that of the conventional technology is used by extending a detection range of elastic waves by arranging the sensors 20. Further, the structure evaluation system 100 performs a correction process so that the bias of the information based on the position location process of the position locator 423 is reduced using the correction value f(x, y) determined in accordance with the impact. More specifically, the structure evaluation apparatus 40 calculates a correction value f(x, y) for a future impact from the vehicle information of the vehicle 10 traveling on the structure 50 serving as the evaluation target. The structure evaluation apparatus 40 corrects an influence of an impact due to the passing of the traveling portion of the vehicle 10 in the elastic wave source density distribution that is the information based on the position location process using the calculated correction value f(x, y). Thereby, it is possible to reduce erroneous diagnosis. Thus, even if the impact applied to the road surface is not uniform, it is possible to improve the accuracy of an evaluation of the structure 50.

The corrector 425 corrects the elastic wave source density distribution with a correction value f(x, y) having at least one or more extreme value portions for correcting information at a position where an impact is applied. The information at the position where the impact is applied is, for example, the information at the position affected by the passing of the traveling portion of the vehicle 10. As described above, the position where the traveling portion of the vehicle 10 passes tends to have a higher density than the position where the traveling portion of the vehicle 10 does not pass. Therefore, the corrector 425 performs correction with the correction value f(x, y) having one or more extreme value portions so that an influence caused by the passing of the traveling portion of the vehicle 10 is reduced. Thereby, it is possible to reduce the influence caused by the passing of the traveling portion of the vehicle 10. As a result, it is possible to improve the accuracy of an evaluation of the structure 50 even if the impact applied to the road surface is not uniform.

Hereinafter, a modified example of the structure evaluation system 100 will be described.

Figure 16:
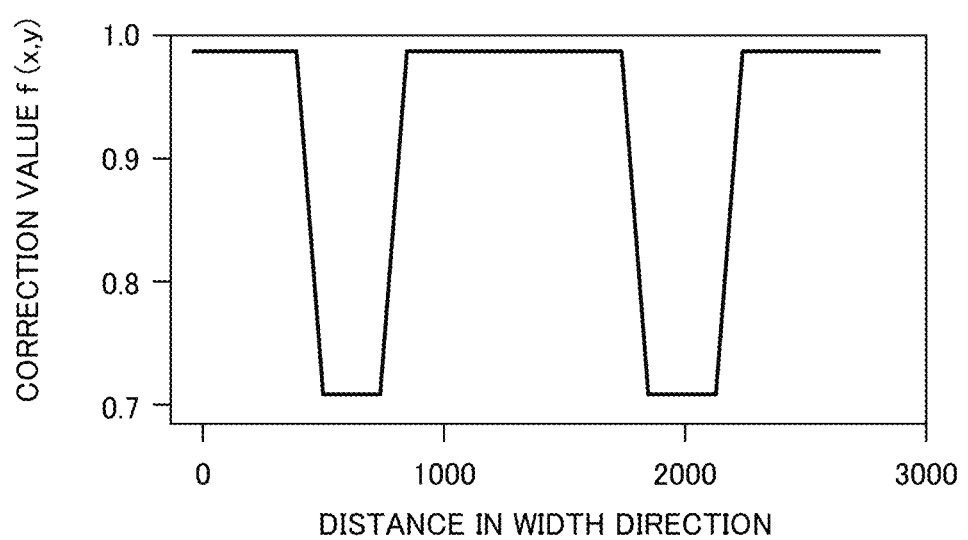
FIG. 16 is a diagram showing another example of the correction value according to the first embodiment.

The correction value is not limited to a form obtained by Eq. (4). For example, as shown in FIG. 16, the correction value may be a distribution represented by a function having a rectangle or a shape close to a rectangle.

The corrector 425 may calculate a correction value f(x, y) closer to an actual value by superimposing a weighted distribution on the tread width for each vehicle type in accordance with a proportion of a vehicle type of the vehicle 10 obtained from the vehicle information.

When all vehicles 10 travel at substantially the same position due to a situation where the road width is significantly narrow, a case where an impact that generates elastic waves 11 is hardly applied to a region other than the wheel load position may also occur. Therefore, the evaluator 426 may be configured to evaluate the deterioration state of the region where a frequency at which an impact is applied is assumed to be greater than or equal to the threshold value within the evaluation target region.

Although a configuration in which the corrector 425 calculates the correction value f(x, y) using the tread width of the vehicle 10 in the vehicle information and the traffic volume information has been described in the above-described embodiment, the corrector 425 may calculate the correction value f(x, y) on the basis of the tread width of the vehicle 10. When the configuration is made as described above, for example, the corrector 425 calculates the correction value f(x, y) by designating the degree of variation w of the passing position as 1 in the above-described Eq. (4). The traveling portion position a may be obtained as in the above-described embodiment.

Thereby, the corrector 425 can calculate the correction value f(x, y) according to information of the tread width even if the traffic volume information cannot be obtained.

Thus, it is possible to perform correction with a small amount of information.

Second Embodiment

In the first embodiment, a configuration in which the corrector 425 calculates the correction value f(x, y) using the vehicle information has been described. In the second embodiment, a configuration in which a correction value f(x, y) is acquired by estimating a position where a vehicle 10 has passed on the basis of an electrical signal obtained from a sensor 20 will be described.

Figure 17:
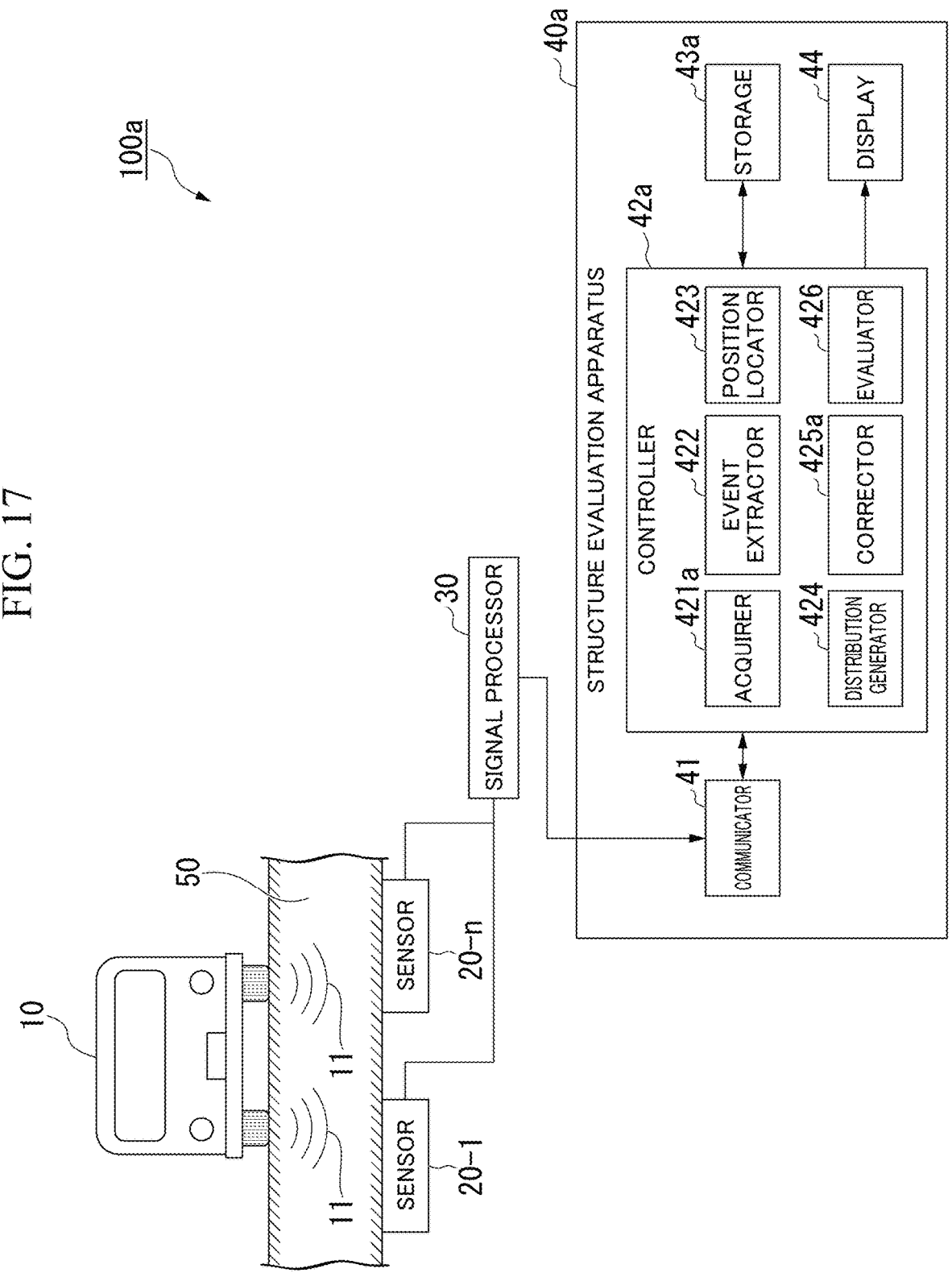
FIG. 17 is a diagram showing a configuration of a structure evaluation system according to a second embodiment.

FIG. 17 is a diagram showing a configuration of a structure evaluation system 100a according to the second embodiment. The structure evaluation system 100a according to the second embodiment is similar to the structure evaluation system of the first embodiment, except that a structure evaluation apparatus 40a is provided in place of the structure evaluation apparatus 40. Hereinafter, a configuration of the structure evaluation apparatus 40a according to a difference will be described.

The structure evaluation apparatus 40a includes a communicator 41, a controller 42a, a storage 43a, and a display 44. The controller 42a controls the entire structure evaluation apparatus 40a. The controller 42a is configured using a processor such as a CPU and a memory. By executing the program, the controller 42a functions as an acquirer 421a, an event extractor 422, a position locator 423, a distribution generator 424, a corrector 425a, and an evaluator 426.

Some or all of the functional units of the acquirer 421a, the event extractor 422, the position locator 423, the distribution generator 424, the corrector 425a, and the evaluator 426 may be implemented by hardware such as an ASIC, a PLD, or an FPGA or may be implemented by software and hardware in cooperation. The program may be recorded on a computer-readable recording medium. The computer-readable recording medium is, for example, a non-transitory storage medium such as a flexible disk, a magneto-optical disk, a ROM, a portable medium such as a CD-ROM, or a storage device such as a hard disk built in a computer system. The program may be transmitted via a telecommunication circuit.

Some of the functions of the acquirer 421a, the event extractor 422, the position locator 423, the distribution generator 424, the corrector 425a, and the evaluator 426 do not need to be mounted in the structure evaluation apparatus 40a in advance and may be implemented by installing an additional application program in the structure evaluation apparatus 40a.

The controller 42a is different from the controller 42 in that the acquirer 421a and the corrector 425a are provided in place of the acquirer 421 and the corrector 425. The differences will be described below.

The acquirer 421a acquires various types of information. For example, the acquirer 421a acquires the transmission data received by the communicator 41. The acquirer 421a stores the acquired transmission data in the storage 43. In the second embodiment, the acquirer 421a acquires information (hereinafter referred to as "robust position information") indicating a position of a robust region in the structure 50 serving as the evaluation target. The acquirer 421a acquires robust position information input from the user.

The corrector 425a corrects information based on the position location process of the position locator 423 using the correction value f(x, y) determined in accordance with the impact. The correction value determined in accordance with the impact in the second embodiment is a correction value obtained on the basis of the electrical signal obtained from the sensor 20. For example, the correction value determined in accordance with the impact in the second embodiment is a correction value obtained by calculating the tread width on the basis of the electrical signal obtained from the sensor 20.

The storage 43a stores the transmission data and the robust position information acquired by the acquirer 421a. The storage 43a is configured using a storage device such as a magnetic hard disk device or a semiconductor storage device.

A flow of a deterioration state evaluation process of the structure evaluation system 100a according to the second embodiment will be described. In the structure evaluation system 100a according to the second embodiment, the processing of step S110 shown in FIG. 13 is different from that in the first embodiment. This difference will be described below.

The corrector 425a inputs the elastic wave source density distribution output from the distribution generator 424 and the robust position information stored in the storage 43a. The corrector 425a corrects the elastic wave source density distribution on the basis of the input elastic wave source density distribution and the robust position information (step S110). Specifically, first, the corrector 425a estimates a passing position of the traveling portion of the vehicle 10 using the elastic wave source density distribution.

As described above, when the vehicle 10 has passed over the road surface, the density of the elastic wave source density distribution in the passing direction tends to increase continuously. More specifically, the density at the position on the elastic wave source density distribution corresponding to the passing position of the traveling portion of the vehicle 10 tends to increase continuously in the passing direction. This is because an impact is continuously applied in the passing direction of the vehicle 10 when the vehicle 10 travels on the road surface. Therefore, the corrector 425a estimates the passing position of the traveling portion of the vehicle 10 on the basis of a first condition and a second condition.

The first condition is a condition in which the region where the density is greater than or equal to the first threshold value in the passing direction of the elastic wave source density distribution is continuous for a first distance or longer. The second condition is a condition in which there are two or more regions that satisfy the first condition in the width direction. When the second condition is satisfied, the corrector 425a estimates each of the regions satisfying the first condition as the passing position of the traveling portion of the vehicle 10.

Subsequently, the corrector 425a calculates a correction value f(x, y) for reducing a value of a position on the elastic wave source density distribution corresponding to the estimated passing position of the traveling portion of the vehicle 10 by a threshold value or more. For example, the corrector 425a calculates a correction value f(x, y) for minimizing the value of the position on the elastic wave source density distribution corresponding to the estimated passing position of the traveling portion of the vehicle 10. The corrector 425a uses robust position information when the correction value f(x, y) is calculated. For example, the corrector 425a calculates the correction value f(x, y) on the basis of a value (hereinafter referred to as a standard value) of the density in the region indicated in the robust position information. The corrector 425a determines a minimum value of the correction value so that the value of the position on the elastic wave source density distribution corresponding to the estimated passing position of the traveling portion of the vehicle 10 is adjusted to the standard value. The corrector 425a corrects the elastic wave source density distribution by multiplying the elastic wave source density distribution by the calculated correction value f(x, y).

In the structure evaluation system 100a configured as described above, the correction value f(x, y) determined in accordance with the impact is acquired from the elastic wave source density distribution. More specifically, the structure evaluation apparatus 40a calculates the correction value f(x, y) for a past impact from the elastic wave source density distribution obtained when the vehicle 10 has traveled on the structure 50 serving as the evaluation target. The structure evaluation apparatus 40a corrects an influence of an impact due to the passing of the traveling portion of the vehicle 10 in the elastic wave source density distribution which is the information based on the position location process using the calculated correction value f(x, y). Thereby, it is possible to reduce erroneous diagnosis. Thus, even if the impact applied to the road surface is not uniform, it is possible to improve the accuracy of an evaluation of the structure 50.

Hereinafter, a modified example of the structure evaluation system 100a will be described.

According to the evaluation region, there may be one passing position of the traveling portion of the vehicle 10. Therefore, the corrector 425a may estimate the passing position of the traveling portion of the vehicle 10 as follows. The corrector 425a estimates that one region satisfying the first condition is the passing position of the traveling portion of the vehicle 10 when the first condition is satisfied and the second condition is not satisfied. In this case, the corrector 425a calculates a correction value f(x, y) for minimizing the value of the position on the elastic wave source density distribution corresponding to the estimated passing position of the traveling portion of the vehicle 10.

By making the configuration as described above, even if there is only one passing position of the vehicle 10 within the evaluation region, it is possible to correct the influence of the impact caused by the passing of the traveling portion of the vehicle 10. As a result, it is possible to improve the accuracy of an evaluation of the structure 50.

In the above-described embodiment, a configuration in which the corrector 425a acquires the correction value f(x, y) by estimating the passing position of the vehicle 10 from the elastic wave source density distribution has been described. On the other hand, the corrector 425a may be configured to correct the elastic wave source density distribution using the correction value f(x, y) generated by the user. In the case of the configuration as described above, the distribution generator 424 outputs the generated elastic wave source density distribution to the display 44 in the processing of step S109. The display 44 displays the elastic wave source density distribution.

The user ascertains a position where the traveling portion of the vehicle 10 has passed with reference to the elastic wave source density distribution displayed on the display 44. The user generates a correction value f(x, y) for limiting an influence caused by the passing of the traveling portion of the vehicle 10 and inputs the correction value f(x, y) to the structure evaluation apparatus 40a. The correction value f(x, y) for limiting the influence is a value for reducing the value corresponding to the density of the elastic wave sources that has increased due to the passing of the traveling portion of the vehicle 10. For example, it is desirable for the correction value f(x, y) for limiting the influence to be a value for eliminating the influence caused by the passing of the traveling portion of the vehicle 10. The corrector 425a corrects the elastic wave source density distribution using the input correction value f(x, y).

By making the configuration as described above, the position where the traveling portion of the vehicle 10 has passed is ascertained by the user's visual recognition. Thereby, it is possible to roughly estimate the position where the traveling portion of the vehicle 10 has passed. The user generates a correction value f(x, y) for limiting the influence caused by the passing of the traveling portion of the vehicle 10 and inputs the correction value f(x, y) to the structure evaluation apparatus 40a. Thereby, the structure evaluation apparatus 40a does not need to calculate the correction value f(x, y). Thus, the processing load can be reduced and the accuracy of an evaluation of the structure 50 can be improved even if the impact applied to the road surface is not uniform.

When all vehicles 10 travel at substantially the same position due to a situation where the road width is significantly narrow, a case where an impact that generates elastic waves 11 is hardly applied to a region other than the wheel load position may occur. Therefore, the evaluator 426a may be configured to evaluate the deterioration state of the region of the evaluation target region where a frequency at which the impact is applied is assumed to be greater than or equal to the threshold value.

By making the configuration as described above, the processing load can be reduced and erroneous diagnosis can be limited.

Third Embodiment

In the first embodiment and the second embodiment, a configuration in which the elastic wave source density distribution is corrected using the correction value f(x, y) has been described. When all vehicles 10 travel at substantially the same position due to a situation where the road width is significantly narrow, a case where an impact that generates elastic waves 11 is hardly applied to a region other than a wheel load position may occur. In this case, even if a region where a frequency at which an impact is applied is less than a threshold value is corrected, a more remarkable effect may not be obtained. Therefore, in the third embodiment, a configuration in which the elastic wave source density distribution is not corrected, a deterioration state of a region where a frequency at which an impact is applied is assumed to be greater than or equal to a threshold value within an evaluation target region is evaluated, and a deterioration state of a region where a frequency at which an impact is applied is assumed to be less than the threshold value is not evaluated will be described.

Figure 18:
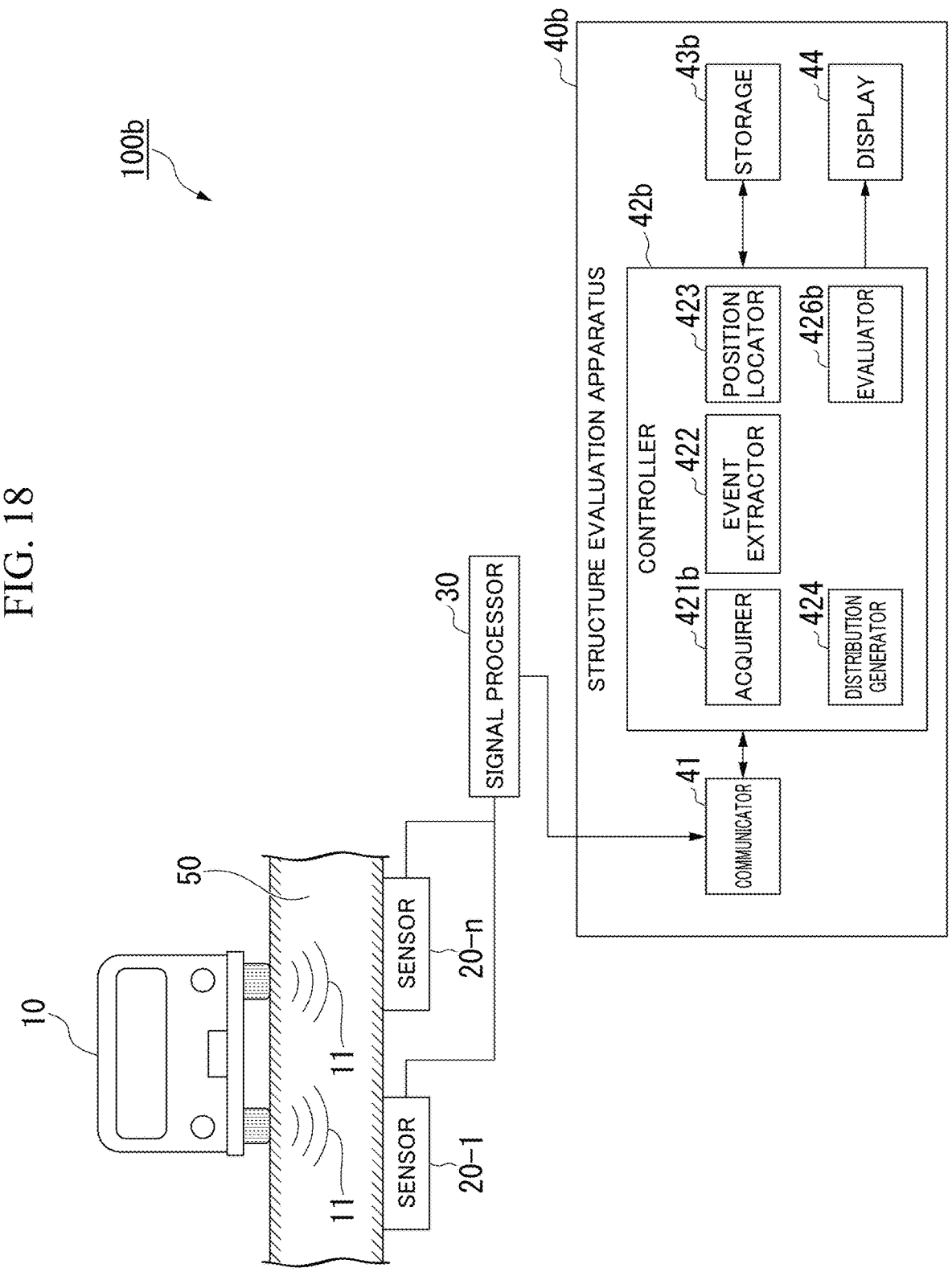
FIG. 18 is a diagram showing a configuration of a structure evaluation system according to a third embodiment.

FIG. 18 is a diagram showing a configuration of a structure evaluation system 100b according to the third embodiment. The structure evaluation system 100b according to the third embodiment is similar to the first embodiment, except that a structure evaluation apparatus 40b is provided in place of the structure evaluation apparatus 40. Hereinafter, a configuration of the structure evaluation apparatus 40b according to the difference will be described.

The structure evaluation apparatus 40b includes a communicator 41, a controller 42b, a storage 43b, and a display 44. The controller 42b controls the entire structure evaluation apparatus 40b. The controller 42b is configured using a processor such as a CPU and a memory. By executing a program, the controller 42b functions as an acquirer 421b, an event extractor 422, a position locator 423, a distribution generator 424, and an evaluator 426b.

Some or all of functional units of the acquirer 421b, the event extractor 422, the position locator 423, the distribution generator 424, and the evaluator 426b may be implemented by hardware such as an ASIC, a PLD, or an FPGA or may be implemented by software and hardware in cooperation. The program may be recorded on a computer-readable recording medium. The computer-readable recording medium is, for example, a non-transitory storage medium such as a flexible disk, a magneto-optical disk, a ROM, a portable medium such as a CD-ROM, or a storage device such as a hard disk built in a computer system. The program may be transmitted via a telecommunication circuit.

Some of the functions of the acquirer 421b, the event extractor 422, the position locator 423, the distribution generator 424, and the evaluator 426b do not need to be mounted in the structure evaluation apparatus 40b in advance and may be implemented by installing an additional application program in the structure evaluation apparatus 40b.

The configuration of the controller 42b is different from that of the controller 42 in that the acquirer 421b and the evaluator 426b are provided in place of the acquirer 421 and the evaluator 426 and the corrector 425 is not provided. The differences will be described below.

The acquirer 421b acquires various types of information. For example, the acquirer 421b acquires transmission data received by the communicator 41. The acquirer 421b stores the acquired transmission data in the storage 43b. In the third embodiment, the acquirer 421b acquires information about a structure 50 serving as an evaluation target. The information about the structure 50 serving as the evaluation target includes at least information of a road width of the structure 50.

The evaluator 426b evaluates a deterioration state of the structure 50 on the basis of a frequency at which an impact is applied. Specifically, the evaluator 426b evaluates a deterioration state of a region where a frequency at which an impact is applied is assumed to be greater than or equal to a threshold value and does not evaluate a deterioration state of a region where a frequency at which an impact is applied is assumed to be less than the threshold value. For example, the evaluator 426b evaluates a region where a density of elastic wave sources is greater than or equal to a threshold value in a region where a frequency at which an impact is applied is assumed to be greater than or equal to the threshold value as a robust region and evaluates a region where a density of elastic wave sources is less than the threshold value in a region where a frequency at which an impact is applied is assumed to be greater than or equal to the threshold value as a damaged region.

The storage 43b stores the transmission data acquired by the acquirer 421b and the information about the structure 50 serving as the evaluation target. The storage 43b is configured using a storage device such as a magnetic hard disk device or a semiconductor storage device.

A flow of a deterioration state evaluation process of the structure evaluation system 100b according to the third embodiment will be described. In the structure evaluation system 100b according to the third embodiment, the evaluator 426b determines whether or not a condition in which a road width of the structure 50 serving as the evaluation target is significantly narrow is satisfied on the basis of road width information included in the information about the structure 50 serving as the evaluation target acquired by the acquirer 421b. The condition in which the road width is significantly narrow is assumed to be preset. For example, the condition in which the road width is significantly narrow is a condition in which the road width is the same as the tread width of a specific vehicle (for example, a normal vehicle) or is a prescribed width (for example, +10 mm) wider than the tread width of a specific vehicle (for example, a normal vehicle). The following process is executed when the condition in which the road width of the structure 50 serving as the evaluation target is significantly narrow is satisfied. On the other hand, when the condition in which the road width of the structure 50 serving as the evaluation target is significantly narrow is not satisfied, the following process is not executed.

When the condition that the road width of the structure 50 serving as the evaluation target is significantly narrow is satisfied, the structure evaluation system 100 executes the processing of steps S101 to S109 shown in FIG. 13. Subsequently, the evaluator 426b evaluates a deterioration state of a region where the frequency at which the impact is applied is assumed to be greater than or equal to the threshold value within the evaluation target region.

The structure evaluation system 100c configured as described above does not evaluate a deterioration state of a region where the frequency at which the impact is applied is assumed to be less than the threshold value. Thereby, it is possible to reduce erroneous diagnosis. Thus, even if the impact applied to the road surface is not uniform, it is possible to improve the accuracy of an evaluation of the structure 50.

Hereinafter, a modified example common to the embodiments will be described.

The signal processor 30 may be included in the structure evaluation apparatus s 40, 40a, and 40b.

In each of the above-described embodiments, a configuration in which a plurality of sensors 20-1 to 20-n are connected to one signal processor 30 has been described. The structure evaluation system 100, 100a, or 100b may include a plurality of signal processors 30 and each sensor 20 may be connected to a different signal processor 30.

Some or all of the functional units included in the structure evaluation apparatus 40, 40a, or 40b may be included in another device. For example, the display 44 included in the structure evaluation apparatus 40, 40a, or 40b may be included in another device. When the configuration as described above is made, the structure evaluation apparatus 40, 40a, or 40b transmits an evaluation result to the other device including the display 44. The other device including the display 44 displays the evaluation result that has been received.

In each of the above-described embodiments, a case where a target (hereinafter referred to as a "non-uniform target") to which a spatially non-uniform impact is applied with respect to the road surface is the traveling portion of the vehicle 10 has been described as an example. In each of the above-described embodiments, the non-uniform target does not need to be limited to the traveling portion of the vehicle 10. For example, non-uniform targets include a sprinkler vehicle, a handcart, a fixed sprinkler, and the like. Hereinafter, detailed description will be given.

(When Non-Uniform Target is Sprinkler Vehicle)

A sprinkler vehicle is a vehicle that can travel on the road surface while spraying water. For example, the sprinkler vehicle is a vehicle equipped with a sprinkler for spraying water behind the vehicle. For example, the sprinkler sprays water droplets (physical objects) in a distribution that becomes a normal distribution using the center of a circular region as a peak. In this case, the impact applied to the road surface is water droplets.

When the sprinkler vehicle has passed over the road surface at a constant speed, a distribution (for example, an elastic wave source density distribution) having a peak at the position of the road surface on which the water droplets are sprayed can be obtained. The corrector 425 or 425a calculates a correction value f(x, y) for limiting the bias of the obtained distribution. The corrector 425 and 425a correct the elastic wave source density distribution by multiplying the elastic wave source density distribution by the calculated correction value f(x, y).

The present invention is not limited to the sprinkler vehicle and a person may apply a spatially non-uniform impact to the road surface by spraying a plurality of physical objects such as water and ice in a prescribed method. As the prescribed method, there is a method in which a person carries a sprinkler and sprays water, a method of spraying water or ice directly on the road surface without using a device (for example, a method of spraying water or ice on the road surface using his/her hand), or the like.

According to this configuration, the present invention can be applied even in a situation where an impact is applied by a portion other than the traveling portion of the vehicle 10. Thus, it becomes possible to improve convenience.

(When Non-Uniform Target is Handcart)

A handcart is a vehicle that can apply an impact to the road surface at regular intervals while traveling on the road surface manually. For example, the handcart is a vehicle equipped with a striking mechanism. The striking mechanism is, for example, a tooth profile rotation mechanism. When the handcart travels on the road surface manually, the tooth profile rotation mechanism comes into contact with the road surface at regular intervals, so that the tooth profile rotation mechanism applies an impact to the road surface.

When such a handcart passes over the road surface, a distribution (for example, an elastic wave source density distribution) can be obtained using a position of the road surface in contact with the tooth profile rotation mechanism as a peak. The corrector 425 or 425a calculates a correction value f(x, y) for eliminating the bias of this distribution. The corrector 425 or 425a corrects the elastic wave source density distribution by multiplying the elastic wave source density distribution by the calculated correction value f(x, y). The striking mechanism is not limited to the tooth profile rotation mechanism and may be any mechanism as long as an impact can be applied to the road surface.

A method of applying an impact to the road surface by the striking mechanism is not limited to the handcart and may be a method of towing the striking mechanism with a vehicle.

According to this configuration, the present invention can be applied even in a situation where an impact is applied by a portion other than the traveling portion of the vehicle 10. Therefore, it becomes possible to improve convenience.

(When Non-Uniform Target is Fixed Sprinkler)

A fixed sprinkler is a spraying device that can spray water droplets in a prescribed range of the road surface at regular time intervals. In this case, the impact applied to the road surface is water droplets. The fixed sprinkler is installed on each of a plurality of streets installed outside of a road on which the vehicle 10 can travel. When water droplets are sprayed on the road surface using such a fixed sprinkler, an impact is applied to a prescribed range of the road surface. The distribution generator 424 generates an elastic wave source density distribution on the basis of the applied impact. Because different water droplets are applied to the road surface for each fixed sprinkler, the distribution generator 424 generates an elastic wave source density distribution according to the water droplets applied from each fixed sprinkler.

The corrector 425 or 425a calculates a correction value f(x, y) for eliminating the bias according to the water droplets applied from each fixed sprinkler for each fixed sprinkler. The corrector 425 or 425a corrects each elastic wave source density distribution by multiplying the elastic wave source density distribution corresponding to each fixed sprinkler by the calculated correction values f(x, y).

According to this configuration, the present invention can be applied even in a situation where an impact is applied by a portion other than the traveling portion of the vehicle 10. Thus, it becomes possible to improve convenience.

In each of the above-described embodiments, an example in which the elastic wave source density distribution becomes information based on the position location process has been described. The information based on the position location process may be any information as long as it is the information obtained using a position location result. For example, the information based on the position location process may be an average amplitude. The average amplitude is calculated by averaging the amplitude of the elastic waves of the first hit detected by the sensor 20 for each impact in each prescribed region. The prescribed region is a region having a prescribed size. The amplitude of the elastic waves of the first hit is used to calculate an average in the prescribed region including the position where the elastic waves of the first hit have been generated. Thus, the average amplitude is close to 0 in a prescribed region where no elastic waves are generated because no impact is applied.

The corrector 425 corrects the average amplitude value for each prescribed region using the correction value f(x, y) determined in accordance with the impact. For example, the corrector 425 performs a correction process with a correction value f(x, y) for reducing a value of an average amplitude in a prescribed region corresponding to a passing position of the traveling portion of the vehicle 10. The evaluator 426 evaluates a deterioration state of the structure 50 for each prescribed region on the basis of the corrected average amplitude value. Specifically, the evaluator 426 evaluates a prescribed region which corresponds to the passing position of the traveling portion of the vehicle 10 and in which the corrected average amplitude value is less than a threshold value as a damaged region. Whether or not the region is the prescribed region corresponding to the passing position of the traveling portion of the vehicle 10 may be determined on the basis of tread width information or may be externally input.

The evaluator 426 may perform an evaluation process as follows in addition to the conventional evaluation method. The evaluator 426 sets a plurality of regions within a prescribed range on a corrected elastic wave source density distribution AD. Thereby, the evaluator 426 segments each region on the corrected elastic wave source density distribution AD. The evaluator 426 makes a comparison with a threshold value 15 for each of regions into which the region is segmented (hereinafter referred to as a "segment region"). For example, the evaluator 426 compares a density within the segment region with the threshold value 15. As a comparison result, the evaluator 426 evaluates a region having a density less than the threshold value 15 as a damaged region.

According to at least one embodiment described above, there is provided a structure evaluation system including: at least three or more sensors 20 arranged on surfaces different from a surface to which an impact is applied with respect to a structure at different intervals in a first direction of the structure and a second direction orthogonal to the first direction and configured to detect elastic waves generated from the structure; the position locator 423 configured to locate a position of a source in which the elastic waves are generated on the basis of the elastic waves detected by each of the three or more sensors 20; and the evaluator 426 configured to evaluate a deterioration state of the structure on the basis of information based on a position location process of the position locator 423 and information indicating a position where the impact is applied, so that it is possible to improve the accuracy of an evaluation of a structure even if an impact applied to a surface of the structure is not uniform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
    at least three or more sensors arranged on surfaces different from a surface to which an impact is applied with respect to a structure at different intervals in a first direction of the structure and a second direction orthogonal to the first direction and configured to detect elastic waves generated from the structure;
    a position locator configured to locate a position of a source in which the elastic waves are generated on the basis of the elastic waves detected by each of the three or more sensors; and
    an evaluator configured to evaluate a deterioration state of the structure on the basis of information based on a position location process of the position locator and information indicating a position where the impact is applied,
    wherein the first direction is a vehicle traveling direction in which the vehicle is traveling, and the second direction is direction orthogonal to the vehicle traveling direction,
    wherein the three or more sensors are arranged at shorter intervals in the second direction than in the first direction, wherein the three or more sensors are arranged in a non-equidistant grid pattern, wherein the three or more sensors are N×M sensors (N and M are integers of 2 or more), the first direction is defined as Z-axis direction, and the second direction is defined as X-axis direction, when the N×M sensors are arranged at apexes of the non-equidistant grid pattern, sensor interval in the X-axis direction from sensor adjacent in the second direction is denoted by q, sensor interval in the X-axis direction from sensor adjacent in the direction parallel to the first direction is denoted by p, and average sensor intervals thereof are denoted by $\bar{q}$ and $\bar{p}$, wherein the $\bar{q}$ and $\bar{p}$ are expressed by the following equation (1)

$$\bar{q} = \frac{1}{M(N-1)} \sum_{n=1}^{M(N-1)} q_n \quad (1)$$

$$\bar{p} = \frac{1}{N(M-1)} \sum_{n=1}^{N(M-1)} p_n$$

$\bar{q}$ and $\bar{p}$ in equation (1) satisfy the following relationship $$\bar{p} > \bar{q}.$$

2. The structure evaluation system according to claim 1, wherein the evaluator designates a region through which an elastic wave ray indicating the source in which the elastic waves are generated and a propagation path of the elastic waves to each of the three or more sensors passes as an evaluation region and evaluates the deterioration state of the structure within the evaluation region.

3. The structure evaluation system according to claim 1,
wherein an arrangement interval in the first direction is a statistical value of a sensor interval in the first direction associated with sensors installed at positions parallel to the first direction, and
wherein an arrangement interval in the second direction is a statistical value of a sensor interval in the second direction associated with sensors installed at positions parallel to the second direction.

4. The structure evaluation system according to claim 1, further comprising a display configured to display an elastic wave ray indicating the source in which the elastic waves are generated and a propagation path of the elastic waves to each of the three or more sensors.

5. The structure evaluation system according to claim 1,
wherein the structure comprises a road on which a vehicle is able to travel,
wherein the structure evaluation system further comprises a corrector configured to correct information based on the position location process using a correction value determined in accordance with the impact, and
wherein the corrector calculates the correction value on the basis of a position of occurrence of the impact caused by contact between a traveling portion of the vehicle and a road surface.

6. The structure evaluation system according to claim 5, wherein the evaluator evaluates a region where a feature value of the elastic waves is less than a first threshold value as a region where deterioration of the structure has occurred.

7. A structure evaluation apparatus comprising:
a position locator configured to locate a position of a source in which elastic waves are generated on the basis of the elastic waves detected by each of at least three or more sensors arranged on surfaces different from a surface to which an impact is applied with respect to a structure at different intervals in a first direction of the structure and a second direction orthogonal to the first direction and configured to detect the elastic waves generated from the structure; and an evaluator configured to evaluate a deterioration state of the structure on the basis of information based on a position location process of the position locator and information indicating a position where the impact is applied, wherein the first direction is a vehicle traveling direction in which the vehicle is traveling, and the second direction is direction orthogonal to the vehicle traveling direction, wherein the three or more sensors are arranged at shorter intervals in the second direction than in the first direction, wherein the three or more sensors are arranged in a non-equidistant grid pattern, wherein the three or more sensors are N×M sensors (N and M are integers of 2 or more), the first direction is defined as Z-axis direction, and the second direction is defined as X-axis direction, when the N×M sensors are arranged at apexes of the non-equidistant grid pattern, sensor interval in the X-axis direction from sensor adjacent in the second direction is denoted by q, sensor interval in the X-axis direction from sensor adjacent in the direction parallel to the first direction is denoted by p, and average sensor intervals thereof are denoted by $\bar{q}$ and $\bar{p}$, wherein the $\bar{q}$ and $\bar{p}$ are expressed by the following equation (1)

$$\bar{q} = \frac{1}{M(N-1)} \sum_{n=1}^{M(N-1)} q_n \quad (1)$$

$$\bar{p} = \frac{1}{N(M-1)} \sum_{n=1}^{N(M-1)} p_n$$

$\bar{q}$ and $\bar{p}$ in equation (1) satisfy the following relationship $$\bar{p} > \bar{q}.$$

8. A structure evaluation method comprising:
locating a position of a source in which elastic waves are generated on the basis of the elastic waves detected by each of at least three or more sensors arranged on surfaces different from a surface to which an impact is applied with respect to a structure at different intervals in a first direction of the structure and a second direction orthogonal to the first direction and configured to detect the elastic waves generated from the structure; and evaluating a deterioration state of the structure on the basis of information based on a position location process and information indicating a position where the impact is applied, wherein the first direction is a vehicle traveling direction in which the vehicle is traveling, and the second direction is direction orthogonal to the vehicle traveling direction, wherein the three or more sensors are arranged at shorter intervals in the second direction than in the first direction, wherein the three or more sensors are arranged in a non-equidistant grid pattern, wherein the three or more sensors are N×M sensors (N and M are integers of 2 or more), the first direction is defined as Z-axis direction, and the second direction is defined as X-axis direction, when the N×M sensors are arranged at apexes of the non-equidistant grid pattern, sensor interval in the X-axis direction from sensor adjacent in the second direction is denoted by q, sensor interval in the X-axis direction from sensor adjacent in the direction parallel to the first direction is denoted by p, and average sensor intervals thereof are denoted by $\bar{q}$ and $\bar{p}$, wherein the q and p are expressed by the following equation (1)

$$\bar{q} = \frac{1}{M(N-1)} \sum_{n=1}^{M(N-1)} q_n \quad (1)$$

$$\bar{p} = \frac{1}{N(M-1)} \sum_{n=1}^{N(M-1)} p_n$$

$\bar{q}$ and $\bar{p}$ in equation (1) satisfy the following relationship $\bar{p} > \bar{q}$.

* * * * *